US008292770B2

(12) United States Patent
Novikov

(10) Patent No.: US 8,292,770 B2
(45) Date of Patent: Oct. 23, 2012

(54) MULTI-CORE ELECTRIC MACHINES

(75) Inventor: Aram Novikov, Santa Clara, CA (US)

(73) Assignee: Aram Novikov, Santa Clara, CA (US)

( * ) Notice: Subject to any disclaimer, the term of this patent is extended or adjusted under 35 U.S.C. 154(b) by 0 days.

(21) Appl. No.: 13/290,037

(22) Filed: Nov. 4, 2011

(65) Prior Publication Data

US 2012/0129639 A1     May 24, 2012

Related U.S. Application Data

(60) Provisional application No. 61/456,538, filed on Nov. 9, 2010, provisional application No. 61/460,009, filed on Dec. 23, 2010, provisional application No. 61/461,858, filed on Jan. 25, 2011, provisional application No. 61/516,597, filed on Apr. 6, 2011.

(51) Int. Cl.
    *F16H 3/72*      (2006.01)
(52) U.S. Cl. ............................................ 475/5; 475/150
(58) Field of Classification Search .............. 475/5, 149, 475/150; 180/65.1, 65.51, 65.6, 372
See application file for complete search history.

(56) References Cited

U.S. PATENT DOCUMENTS

| | | | |
|---|---|---|---|
| 4,335,429 A | 6/1982 | Kawakatsu |
| 4,423,794 A | 1/1984 | Beck |
| 4,525,655 A | 6/1985 | Walker |
| 4,973,295 A | 11/1990 | Lee |
| 5,067,932 A | 11/1991 | Edwards |
| 5,300,848 A | 4/1994 | Huss et al. |
| 5,375,865 A | 12/1994 | Terry, Sr. |
| 5,749,448 A | 5/1998 | Maile |
| 5,823,280 A | 10/1998 | Lateur et al. |
| 5,845,731 A | 12/1998 | Buglione et al. |
| 5,851,162 A | 12/1998 | Tether |
| 5,947,854 A | 9/1999 | Kopko |

(Continued)

FOREIGN PATENT DOCUMENTS

CN      101633305 A      1/2010

(Continued)

OTHER PUBLICATIONS

Sakota, Koji et al., "Calculation of Fuel Consumption on Hybrid Power System Driven by Two Motors Connected in Series with CVT", Proceedings of the International MultiConference of Engineers and Computer Scientists, vol. II, IMECS 2010, Mar. 17-19, 2010, Hong Kong, 2010, 5 pages.

(Continued)

*Primary Examiner* — Justin Holmes
*Assistant Examiner* — Huan Le
(74) *Attorney, Agent, or Firm* — Dorsey & Whitney LLP

(57) ABSTRACT

An electric machine including a housing, a first rotor and stator carried within the housing and a rotatable shaft carried by the housing and extending from the housing. A first continuously variable transmission can be provided and includes a first rotatable element, a second rotatable element and a mechanism for controlling the ratio of the rotation of the second element to the rotation of the first element. The first element can be connected to the first rotor and the second element can be connected to the rotatable shaft. A second rotor and stator can be carried within the housing and a second continuously variable transmission provided. A hybrid engine having an internal combustion engine and utilizing the electric machine can be provided.

19 Claims, 17 Drawing Sheets

U.S. PATENT DOCUMENTS

| | | | |
|---|---|---|---|
| 6,026,921 | A | 2/2000 | Aoyama et al. |
| 6,131,680 | A | 10/2000 | Nii et al. |
| 6,306,057 | B1 * | 10/2001 | Morisawa et al. ............ 475/5 |
| 6,470,985 | B1 | 10/2002 | Inada et al. |
| 6,527,074 | B1 * | 3/2003 | Morishita ............ 180/65.1 |
| 6,557,656 | B2 | 5/2003 | Haniu et al. |
| 6,569,055 | B2 | 5/2003 | Urasawa et al. |
| 6,570,265 | B1 | 5/2003 | Shiraishi et al. |
| 6,608,396 | B2 | 8/2003 | Downer et al. |
| 6,637,283 | B2 | 10/2003 | Belloso |
| 6,725,954 | B1 | 4/2004 | Keane et al. |
| 6,817,432 | B2 | 11/2004 | Kitada et al. |
| 6,962,545 | B2 | 11/2005 | Larkin |
| 7,030,528 | B2 | 4/2006 | Morgante |
| 7,053,566 | B2 * | 5/2006 | Aizawa et al. ............ 318/34 |
| 7,196,430 | B2 | 3/2007 | Yang |
| 7,223,200 | B2 | 5/2007 | Kojima et al. |
| 7,371,201 | B2 | 5/2008 | Usoro |
| 7,597,164 | B2 | 10/2009 | Severinsky et al. |
| 7,654,930 | B2 | 2/2010 | Rohs et al. |
| 7,699,747 | B2 | 4/2010 | Imanishi |
| 7,713,163 | B2 | 5/2010 | Hayashi et al. |
| 2002/0091028 | A1 * | 7/2002 | Kashiwase ............ 475/5 |
| 2007/0072723 | A1 * | 3/2007 | Klemen et al. ............ 475/5 |
| 2007/0129198 | A1 | 6/2007 | Atarashi |
| 2007/0155558 | A1 | 7/2007 | Horst et al. |
| 2007/0255463 | A1 | 11/2007 | Kikuchi |
| 2008/0110684 | A1 | 5/2008 | Kaita |
| 2008/0115988 | A1 | 5/2008 | Holland |
| 2008/0182694 | A1 * | 7/2008 | Holmes ............ 475/5 |
| 2009/0170649 | A1 | 7/2009 | Murakami et al. |
| 2009/0243411 | A1 * | 10/2009 | Moeller ............ 310/90 |
| 2010/0120579 | A1 * | 5/2010 | Kawasaki ............ 477/3 |
| 2011/0031838 | A1 | 2/2011 | Serra et al. |
| 2011/0130235 | A1 | 6/2011 | Phillips |

FOREIGN PATENT DOCUMENTS

| | | |
|---|---|---|
| DE | 19533871 A1 | 8/1997 |
| EP | 0392780 B1 | 6/1994 |
| EP | 1065362 A1 | 1/2001 |
| EP | 1975027 A1 | 10/2008 |
| JP | 11-55810 | 2/1999 |
| KR | 10-0302770 B1 | 11/2001 |
| WO | 2007/140123 A2 | 12/2007 |
| WO | 2009/026690 A2 | 3/2009 |
| WO | 2010/077058 A2 | 7/2010 |
| WO | 2010/092402 A1 | 8/2010 |
| WO | 2011/109891 A1 | 9/2011 |

OTHER PUBLICATIONS

International Search Report and Written Opinion, PCT/US2011/059467, Mar. 16, 2012, 8 pages.

* cited by examiner

MULTI-CORE ELECTRIC MACHINES

CROSS REFERENCE TO RELATED APPLICATIONS

This application claims benefits of U.S. provisional patent applications Ser. Nos. 61/456,538 filed Nov. 9, 2010, 61/460,009 filed Dec. 23, 2010, 61/461,858 filed Jan. 25, 2011 and 61/516,597 filed Apr. 6, 2011, the entire contents of each of which is incorporated herein by this reference.

FIELD OF INVENTION

The present invention relates to electric machines and their applications, and more particularly to electric machines with continuously variable transmissions.

BACKGROUND OF THE INVENTION

Electric motors and generators have certain characteristics rendering them suitable for use in many industries and devices for converting electrical energy into mechanical energy and vice versa. Despite being simple and reliable, electric machines have drawbacks.

One drawback is that the efficiency of electric machines drops dramatically when the load is below 70-50% of a machine's full load. This drawback is sometimes disregarded, since in general the efficiency of electric machines is much higher than of internal combustion engines and many other types of engines.

Another widely known drawback is that electric motors have higher power consumption during acceleration than in a steady state.

Multiple electric machine arrangements have been developed in an effort to address these limitations.

See for example, U.S. Pat. No. 4,525,655 that describes an electric motor drive system having a first direct current electric motor, a first drive shaft to which the first electric motor is coupled, a second direct current electric motor having a higher power rating than the first, a second drive shaft to which the second electric motor is coupled, the second drive shaft comprising a hollow sleeve with the first drive shaft extending therethrough, an epicyclic gear system comprising a sun gear to which the first drive shaft is coupled, a ring gear to which the second drive shaft is coupled, and planetary gears meshing with both the sun gear and the ring gear, an output drive coupled to the planetary gears, and, a one way rotation restraining means coupled to the ring gear to permit rotation of the ring gear in one direction and to prevent rotation of the ring gear in the other direction. This system is somewhat limited because the first and the second electric machines are coupled together at all times by an epicyclic gear system, and at low loads higher power rating machine is engaged too, along with the low power electric machine, working at a low efficiency point and therefore reducing the overall system efficiency. Even if it is possible to stop completely one of the machines while other is working (restraining rotation of one of the members of planetary gear set), such condition would change transmission ratio of the planetary gear set, forcing the second machine to operate at lower efficiency bandwidth. Independent and controllable contribution of each of the electric machines to the total performance of the device is not disclosed.

Another area of use of multiple electric machine arrangement is hybrid power trains, which combine multiple electric machines and an internal combustion engine (ICE). Since typically ICE's efficiency is much lower than efficiency of electric machines, the combination of both devices can increase the overall system efficiency.

Hybrid power trains typically consist of multiple electric machines interconnected together, an ICE, battery bank to store and provide electrical energy, and controllers. In such arrangements electric machines can perform both as motors, supplying power to the output shaft, or generators, converting ICE power into electrical one for battery bank charging.

U.S. Pat. No. 6,131,680 describes such system. In this invention crankshaft of ICE is mechanically linked to the planetary carrier, the first motor with the sun gear and the second motor with the ring gear. A controller drives the second motor with electric power regenerated by the first motor or drives the first motor with electric power regenerated by the second motor, based on a gear ratio of the sun gear to the ring gear of the planetary gear, thereby enabling the power output from the engine to be converted to a desired power and output to a power transmission gear mechanically connected with the ring gear. This structure allows the engine to be driven at a desired driving point of highest possible efficiency, thereby enhancing the efficiency of the whole apparatus. Even if it is possible to operate both electric machines as motors only or as generators only, the electric machines are coupled together mechanically through the planetary gear set and both electric machines are always engaged, limiting the efficiency of such system at low or intermittent loads. Independent and controllable contribution of each of the electric machines to the total performance of the device is not disclosed.

U.S. Pat. No. 6,962,545 discloses another hybrid power train. A parallel-hybrid transmission has one or more electrical motor/generator units. The motor/generators are coaxially or concentrically arranged with the transmission input and output shafts via planetary gear sets. Associated clutch closures selectively couple power to and from the sun gears and planetary carriers of the gear sets through a complex planetary gear configuration such as Ravigneaux gear set for switching between certain operational modes. The clutch and brake operations selectively achieve multiple ratio range operations including engine starting under electric power, high torque acceleration from a standstill, regenerative deceleration (braking), multiple ratio range operation, load sharing, rotation matched speed-less shifting and combined or individual continuously variable combustion engine and electric motor and/or generation modes.

This invention is limited by several factors. It uses complex system of clutches to switch between different modes of operation. In addition, since a system of clutches used, it does not allow a smooth, efficient and seamless combination or distribution of power between both electric machines. Moreover, it does not allow independent and controllable power combination or distribution between electric machines. Another limitation of the invention is the usage of complex Ravigneaux gear set as one of the gear sets, which adds to the complexity of the machine and reduces its overall efficiency.

U.S. Pat. No. 7,053,566 discloses yet another hybrid drive train. A drive train for a hybrid electric vehicle has an engine, first and second motor/generators, a third motor, and a transmission in connecting relationships with the engine, the motor/generators, and the third motor. The transmission has planetary gear sets to be shifted among a plurality of running modes including a large driving force running mode. A controller controls surplus power caused by power balance between the first and the second motor/generator to be supplied to the third motor when the surplus power is generated and the vehicle starts with the transmission being operated in the large driving force running mode. Since either both of the first and second motors/generators are either engaged together or have one of the motors/generators grounded using a clutch and/or a brake, the invention does not allow smooth and seamless combination of both electric motors/generators. Moreover, the usage of plurality of clutches and brakes adds to the complexity of the system. Further, the invention does not allow independent and controllable power combination or distribution between electric machines.

U.S. Pat. No. 7,371,201 discloses a family of transmission devices, consisting of three motors/generators. The three motors/generators are operated in a coordinated fashion to yield continuously variable forward and reverse speed ratios between the input shaft and the output shaft, while minimizing the rotational speeds of the motor-generators and optimizing the overall efficiency of the system. This invention is limited by the fact that all planetary gear sets are interconnected, therefore all of the motors/generators are also interconnected in such a manner that it is not possible to combine or distribute power completely independently between the electric machines at any given input to output speed ratio of the transmission system. Operation speed change of any of the motors/generators affects the operation speed of the rest of motors/generators at a given input to output transmission ratio.

The publication "Calculation of fuel consumption on hybrid power system driven by two motors connected in series by CVT" (Koji SAKOTA, Kazuya OKUBO, Toru FUJII, Proceedings of the international multi-conference of engineers and computer scientists. March 2010) describes a system, which consists of two motors: main motor and a sub motor, connected in series through a single continuously variable transmission (CVT) and a mechanical clutch. ICE is connected in series to the sub motor through a clutch as well. The sub motor is held at constant back electromotive force (EMF), while the main motor is connected to the vehicle's wheels and supplies power as it is demanded by driver. The role of CVT is to match the sub motors' speed to the speed of the main motor, since the sub motor works at constant, predetermined EMF. It was found during research that this set up increases efficiency of the entire drive train by approximately 6% on urban standard driving cycle, while in other conditions there was no efficiency increase. One of the objectives of the research was finding most beneficial predetermined and constant point of operation of the sub motor and most beneficial in terms of overall system efficiency rated output powers of the main and sub motors. One shortcoming of this proposed solution is its inflexibility. Since the motors are connected in series, they are coupled together so that the main motor works at all times, even while its working point is in a very inefficient bandwidth. Although the sub motor works constantly at predetermined working point with relatively high efficiency, its contribution to the overall system is limited since the main motor is always connected to the wheels and operates at all times, thereby reducing the overall system efficiency.

U.S. Pat. No. 6,637,283 discloses an apparatus for extending the drive ratios and versatility of a continuously variable transmission (CVT) includes an enclosure which houses parallel input and output shafts journaled to front and rear walls of the enclosure. The input shaft receives rotative force directly from one or two CVT units. Low gear, drive gear and reverse gears are disposed upon the input shaft. Corresponding driven low gear, drive gear and reverse gears are disposed upon the output shaft. The corresponding gears are connected by positive drive belts. Coupling devices axially sliding upon splines in the input shaft in response to a shifting lever achieve low, drive, reverse and park modalities of the apparatus. This invention cannot be used with electric motors or generators since it contains a relatively large number of gears and drive belts, which reduce significantly the efficiency of the system. In addition, the invention is of little value to electric motors since other more efficient techniques for implementing reverse rotation in electric motors have been provided. Further, the relatively high speeds and output torques of electric motors limits the applicability of the invention to electric motors.

As can be seen from the foregoing, there is a need for an electric machine which addresses the abovementioned shortcomings.

DETAILED DESCRIPTION OF THE INVENTION

Figure 1:
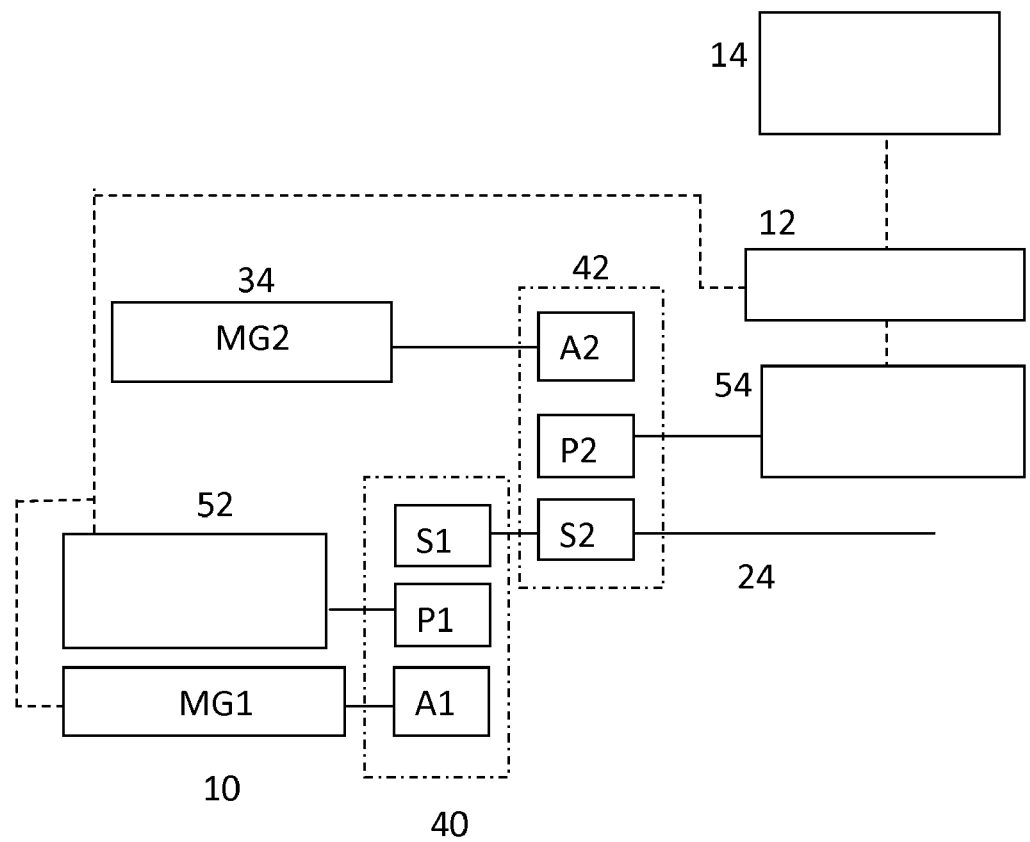
FIG. 1 shows a system configuration of dual core electric machine.

The invention herein describes a way of combining multiple electric machines as a single output device which can improve overall efficiency under different load conditions when compared to the efficiency of a single motor of equal power. Such a combining of multiple electric machines allows smooth, independent and controllable combination or distribution of power between electric machines in the entire operational range, so that at each given point of time either only one machine, several machines or all of the machines are working, and the power can be distributed to or combined from any particular machine in the range of 0-100% of the total output power of the device.

Based on the same principle multi core electric machine is disclosed, where each of the cores can comprise stator-rotor pair, means to connect the rotor to a single common output shaft and actuator, controlling said connection, works independently of other cores, allowing smooth and controllable blending of output power from each core (in case of electric motors) to a single common output shaft. In case of electric generators, it allows smooth and controllable distribution of power among all cores.

Furthermore, a modular multi core electric machine is disclosed, where each core can have its own mechanical and electrical interface so that multiple cores can be easily combined together. This can be useful particularly in applications where quick and inexpensive upgrade or downgrade of the multi core electric machine is needed.

A hybrid electric drive train is disclosed, in which each electric machine can operate independently of each other so that overall system efficiency is maximized. In one embodiment of the present invention no mechanical clutches or brakes are used so as to reduce complexity and cost of the system.

The invention includes a multi-core electric machine which can work as generator or as a motor. The first core of the motor can be comprised of housing, a first planetary gear set, a first rotor (connected to the first member of the first planetary gear set), a first stator (connected rigidly to the housing and situated in close proximity to the first rotor so that air gap width between the stator and the rotor is as small as possible), and a first actuator (connected to the second member of the first planetary gear set). The planetary gear set can comprise a rotatable sun gear, which meshes with plurality of rotatable planet gears carried by a carrier and a rotatable ring gear (also referenced as annulus) which meshes with each of the planet gears. Each of the sun, ring and planet gears are referred herein as members of planetary gear set. During the operation of the core, the stator creates an excited magnetic field in proximity to the rotor so that electromotive force is applied to the rotor causing rotation. Epicyclic gear and planetary gear systems are synonymous herein.

The multi-core motor of the invention can further be comprised of a second core, which includes a stator (rigidly connected to the housing) and a second rotor, situated in close proximity to the second stator so that the air gap width between the second stator and the second rotor is as small as possible. As with the first core, during operation the second stator creates an excited magnetic field in proximity to the second rotor so that electromotive force is applied to the second rotor. The power rating of the second stator-rotor can be higher than that of the first stator-rotor. The first member of the second planetary gear set can be connected to the second rotor and the second member of the second planetary gear set can be connected to the second actuator.

Third members of the first and the second planetary gear sets can be connected rigidly to one common output shaft so that the third members rotate one-to-one with the output shaft.

The actuators can be electrical actuators of alternate current type or direct current type with a smaller power rating than the power rating of a respective core. The planetary gear sets can be coupled with actuators work as electrically controlled continuously variable transmissions (CVT).

An electrical controller can control each core independently and simultaneously by changing rotational speeds of the actuators and rotors so that each core and the entire system as a whole can deliver output torque and speed (required by a user) to the common output shaft, with each core operating as efficiently as possible.

One of the ways to implement the control functions disclosed below is based on reading preloaded performance maps of each of the cores and calculating the optimum working point of each core based on simple search and comparison of performance map data.

The arrangement of this invention can allow increased efficiency of the electric machine by up to 30% and more, especially at low and intermittent loads, depending on the characteristics of the cores and actuators used in the machine. Moreover, the invention can permit the elimination of final gears, since the machine has embedded a continuously-variable transmission.

Since each core operates independently of the others, the power electronics needed to operate the electric machines of the invention can be significantly less expensive than a conventional electric machine of the same power, as several lower-power electronic components can be used instead of higher-power components which are typically used in conventional machines.

The invention describes a way of combining multiple electric machines into a single-output device. Multiple separate electric machines can be connected together by means of continuously variable transmissions of a mechanical type. Such mechanical, continuously-variable transmissions, also known as CVTs, can be comprised of a mechanical input, a mechanical output and the means to change the rotational speed of the mechanical output relative to the mechanical input. The mechanical inputs and outputs can be shafts. There are many different means to change relative rotational speeds in such CVTs. For instance, a mechanical CVT called "NuVinci," manufactured by Fallbrook Technologies Inc., can be used.

Since mechanical actuators are typically reversible (the input can work as output and vice versa), the terms "input" and "output" are relative and have each been referred to herein by other terms such as a "rotatable element."

The output shaft of a first electrical machine can be connected to a first rotatable element of a first mechanical CVT, while the second rotatable element of the first CVT can be connected to a single common output shaft.

The output shaft of a second electrical machine can be connected to a first rotatable element of a second mechanical CVT, while a second rotatable element of the second CVT can be connected to the same single common output shaft.

If in some cases increased transmittable torque through a CVT is desired, planetary gears can be incorporated with the CVTs. In one such embodiment, the first rotatable element of mechanical CVT, such a mechanical CVT sometimes referred to herein as "a mechanical actuator," can be connected to the output shaft, and since the output shaft can rigidly connected to a third member of the planetary gear set of each core, the input of the mechanical actuator can also be connected to the third member.

The output shaft of the mechanical actuator can be connected rigidly to a second member of a first and second planetary gear sets so that rotation of the output shaft is modulated by the mechanical actuator. This modulated rotation of the output shaft can be transmitted to the second members of the planetary gear sets.

Output shafts of the first and second electric machines can be connected to a third members of the first and second planetary gear sets.

The separate electric machines and the mechanical actuators can be enclosed in a single common enclosure.

A multi core electric machine is disclosed below. Such machine can comprise several rotor-stator pairs, connected to a single output shaft by means of planetary gear sets, while one of the members of planetary gear set can be modulated by electrical or mechanical actuator in order to control independently the contribution of each core to overall system performance. This scheme allows for superimposing the performance characteristics of each of the cores.

FIG. 1 shows a system configuration of one of the embodiments, axial flux permanent magnet machine.

The planetary gear sets, used in such embodiment, can include a rotatable sun gear (marked on the drawings as S), which meshes with plurality of rotatable planet gears carried by a carrier (marked on the drawings as P) and a rotatable ring gear (also referenced as annulus and marked on the drawings as A) which meshes with each of the planet gears.

The first motor/generator 10 can be connected to the ring gear A1 of the first planetary gear set 40, while the second motor/generator 34 can be connected to the ring gear A2 of the second planetary gear set 42. The sun gears S1 and S2 of planetary gear sets 40 and 42 can be connected to a single output shaft 24.

Numbers aside each of the letters S, P and A denote a respective planetary gear set, e.g. S1 is the sun gear of the first planetary gear set 40.

In this configuration, the carriers of planetary gear sets 40 and 42 are rotated by two electrical actuators 52 and 54. The controller 12 controls rotational speeds and output torques of actuators 52 and 54 as well as the motors/generators 10 and 34. The energy storage device 14 is connected to the system through the controller 12. Actuators for any type of electric motors can be chosen for this purpose, depending on application demands. For instance, cheap DC actuators can be chosen where the cost is more important than system performance. The planetary gear sets 40, 42, which are coupled to the actuators 52 and 54, work in this case as an electrically-actuated continuously variable transmission (CVT), while the ring gear is an input and the sun gear is an input.

The electrically-actuated CVT version of the system is not limited to one, shown in FIG. 1. The actuators 52, 54 can be connected to any member of the respective planetary gear sets 40, 42, while inputs and outputs 10, 34 of the CVTs should be connected to any other members of the respective planetary gear sets 40, 42 that are not occupied by the actuators 52, 54. The common output shaft 24 can be connected to the remaining members of the planetary gear sets 40, 42. Thus for example, actuator 52 can be connected to any of sun gear S1, ring gear A1 or carrier P1 of the planetary gear set 40, in which case the first motor/generator 10 would be connected to either of the remaining two elements (S1, A1, P1) of the planetary gear set 40 not occupied by the actuator 52 and the output shaft 24 would be connected to the remaining element (S1, A1, P1) of the planetary gear set 40 not occupied by the actuator 52 and first motor/generator 10. Similarly, actuator 54 can be connected to any of sun gear S1, ring gear A1 or carrier P1 of the planetary, near set 42, in which case the second motor/generator 34 would be connected to either of the remaining two elements (S1, A1, P1) of the planetary near set 42 not occupied by the actuator 54 and the output shaft 24 would be connected to the remaining element (S1, A1, P1) of the planetary gear set 42 not occupied by the actuator 54 and second motor/generator 34. Moreover, additional gearing between the two branches of the system is possible, depending on the particular application.

One of the particular designs of the proposed embodiment is shown in FIGS. 2-5. This embodiment is a compact, multi-core, axial flux, electric machine which consists of only two cores (the cores can also be referred to as stages). Each core comprises of rotor, stator, planetary gear set and an actuator, which modulates the rotation of one of the planetary gear set members, as it is described below. The number of cores can be increased, depending on the particular application.

In this example, one core is more powerful than the other, but a combination of two different types of electric machines (not only different output powers) is also possible, depending on the particular application. The same principle of design and operation is not limited to axial flux, permanent magnet machines (AFPM), but applicable to any other types of electric machines with some design variations, depending on the electric machine type.

Figure 2:
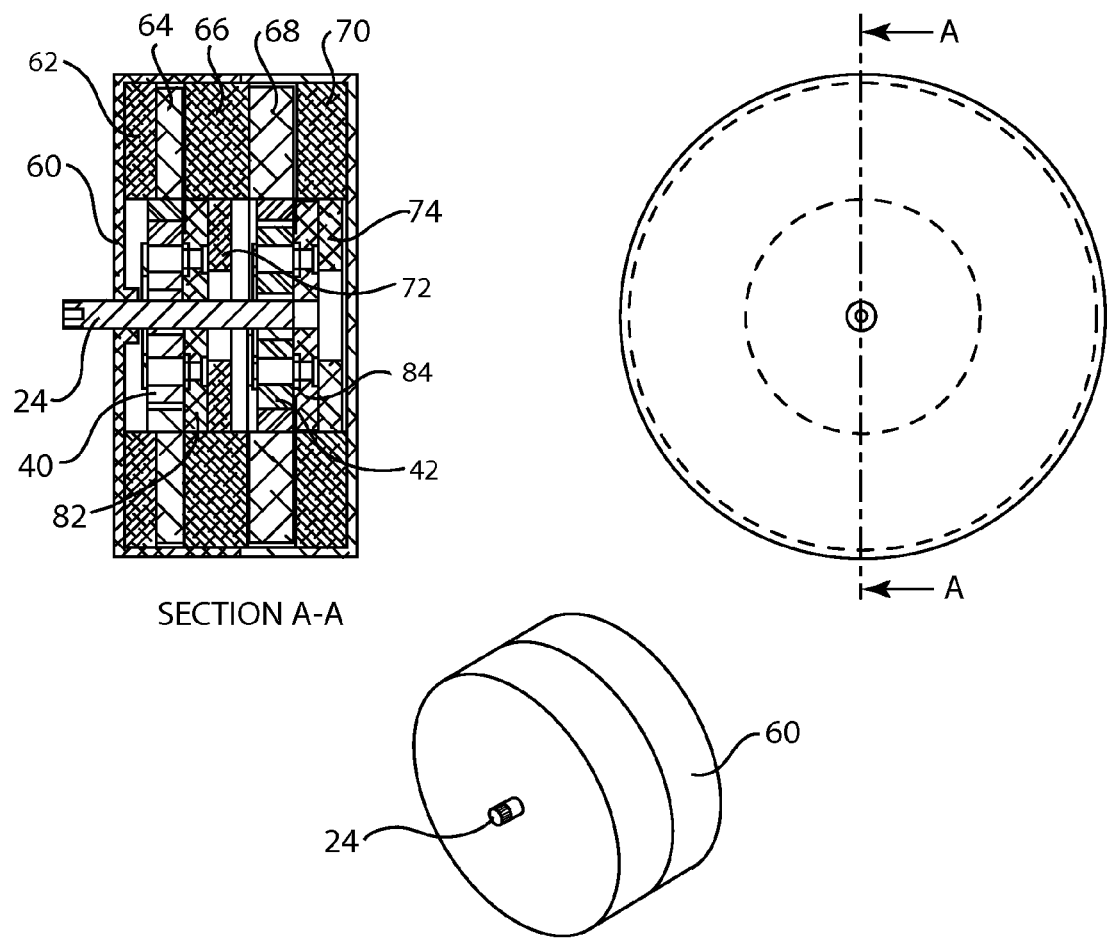
FIG. 2 shows the dual core electric machine and its cross section.

FIG. 2 shows an isometric view of the motor/generator and its cross section. The cross section shows the main components of the motor: the common output shaft 24 is rigidly connected to the sun gears of the first and second planetary gear sets 40 and 42. The first and second electrical actuators 52 and 54 are comprised of the first rotor 82, the first stator 72, the second rotor 84, and second stator 74. The rotors 82 and 84 of the electric actuators 52 and 54 are connected to the carriers of planetary gear sets 40 and 42, while actuator/stators 72 and 74 are mechanically connected to the housing 60 through stators 66 and 70. The first core of the electric machine comprises the first stator 62, the first rotor 64, the partial stator 66 and planetary gear set 40 and actuator 52. Stator 66 is a double-sided stator, so that its excitation and electromagnetic force drives rotor 64 of the first core and rotor 68 of the second core. The second core of the machine is comprised of stator 66, rotor 68, stator 70, planetary gear set 42 and actuator 54. For the sake of simplicity, the cooling system of the motor is not shown on the figure, as well as the bearings and lubrication systems.

The rotors 64 and 68 are rigidly connected to the ring gears of planetary gear sets 40 and 42 respectively.

The rotor-stator pairs 62, 64, and 66 of the first core are of a lower power rating than rotor-stator pairs 66, 68 and 70.

Figure 3:
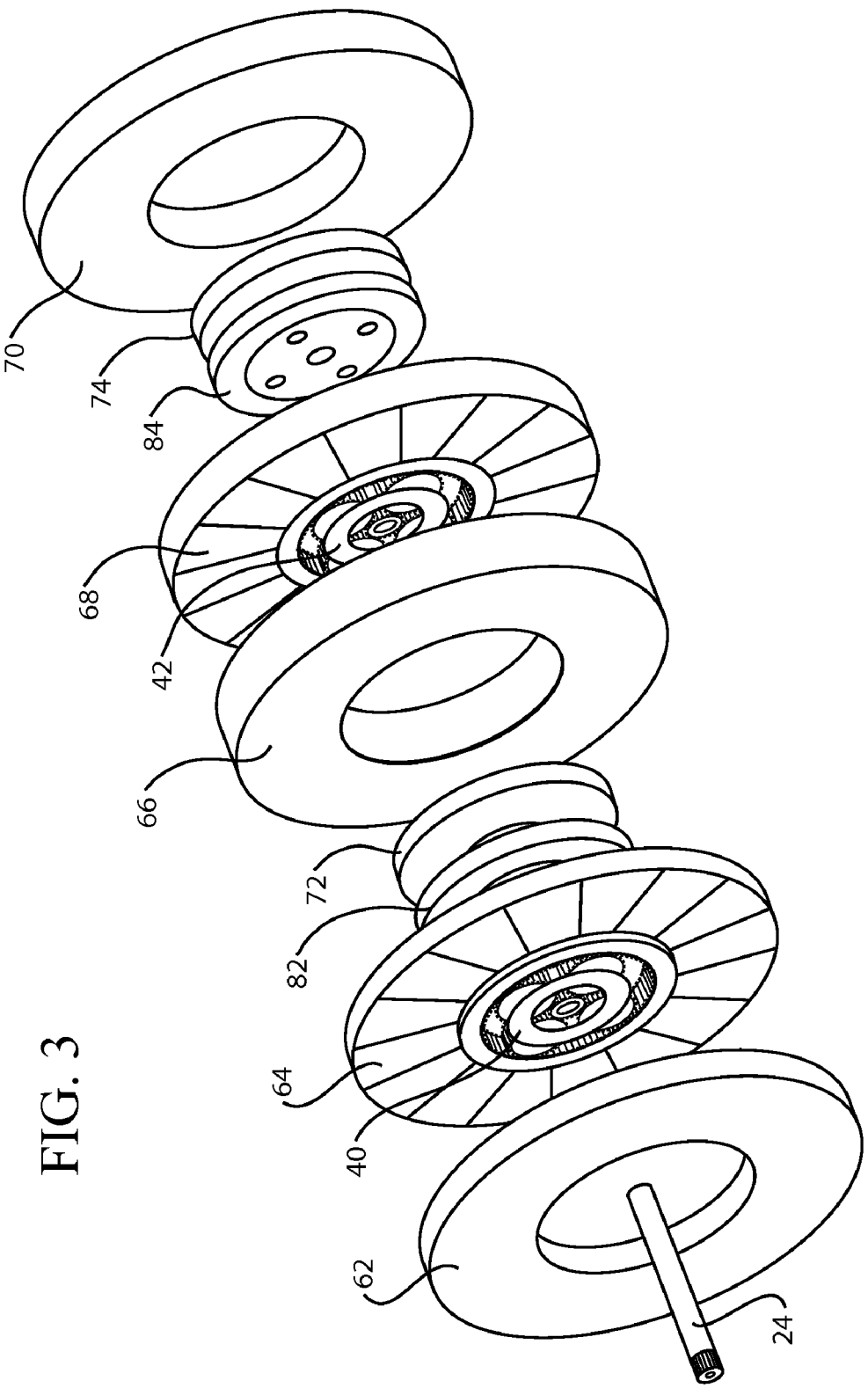
FIGS. 3 and 4 show exploded view of the dual core electric machine (no enclosure is shown).
Figure 4:
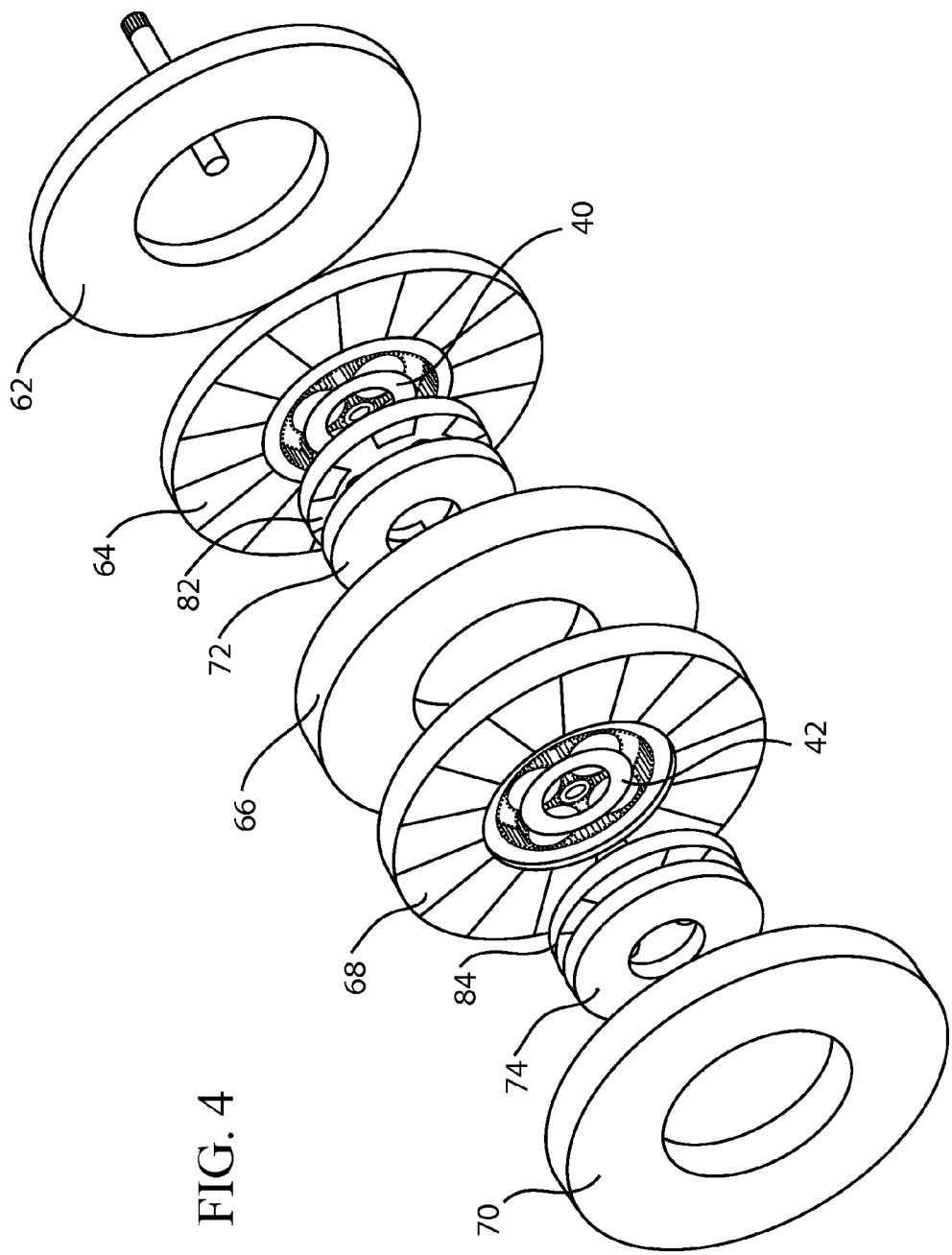
Figure 5:
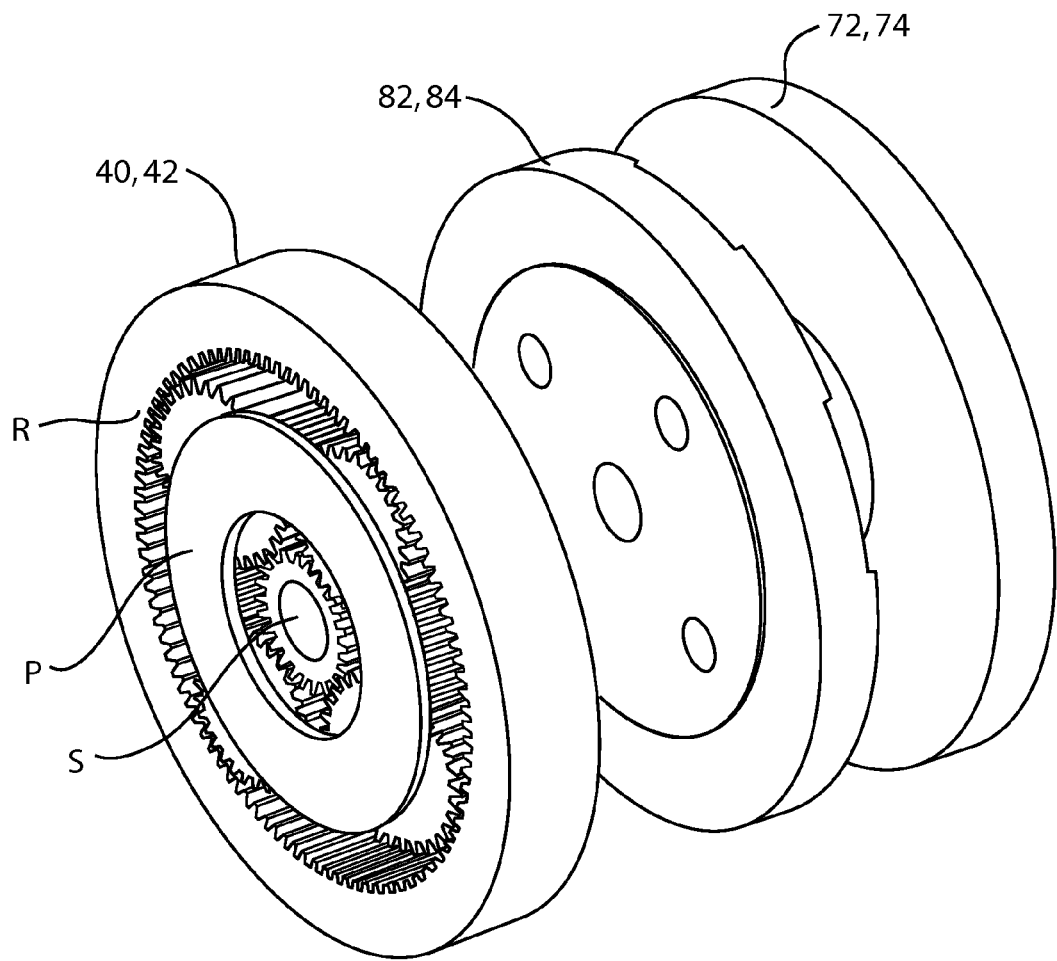
FIG. 5 shows connection of electric actuator to a planetary gear set.

FIGS. 3 and 4 show the exploded views of the electric machine, and FIG. 5 shows the connection of either one of the planetary gear sets 40 and 42 to the rotor and stator of either one of the first or second actuators 52 and 54.

The rotors 82 and 84 of the actuators are connected directly to the carrier of the planetary gear set, however it can be connected to any other member of the same. In this example, the transmission variation between rotors 64 and 68 occurs while the speed of planets is changed by the actuator.

The double-sided stator 66 works with asymmetric excitation, having different excitations on each side. This must be carefully managed by control electronics in order to avoid undesirable side effects, such as unwanted generation on one of the stator sides. If needed, the double-sided stator can be replaced by two single-sided stators, mechanically connected together. The purpose is to isolate the magnetic fields of the stators, avoiding undesirable side effects.

The actuators 52 or 54 are a single-sided, simple AFPM AC motor with low power output. Their main function is to change the gear ratio of the planetary gear set 40 or 42. The actuator must be powerful enough to support a situation where the rotor of any core is idling at nearly zero rounds per minute, but the sun gear of the planetary gear set is rotated by the other cores. However, if the actuator is not powerful enough to support the situation where the core rotor 64 or 68 is completely idling, the core can add power by rotating the core rotor at needed speed. In this case, the control algorithm should choose appropriate power outputs from the actuator and the core in order to minimize overall losses.

The design of the AFPM machine is not limited to the disclosed version. Many other variations can be introduced, including variations of the design of planetary gear set actuators 52 or 54, where the actuator can be connected to any gears of the planetary gear set, including the sun gear and the ring.

The actuator 52 or 54 can come from any type of electric machine with controlled output speed. The output torque of the actuator needed to power up the planetary gear set should be much lower than the output torque of its core. But rotational speed should be higher, and the actuator should be able to change direction of rotation in order to support the entire operational range of its core.

The electrically-actuated planetary gear set performs as a continuously-variable transmission, which is electrically controlled. The core rotor 64 or 68 is connected to the annulus of the planetary gear set, however design variations are possible, so that the rotor can be connected to any other member of the planetary gear set.

Figure 6:
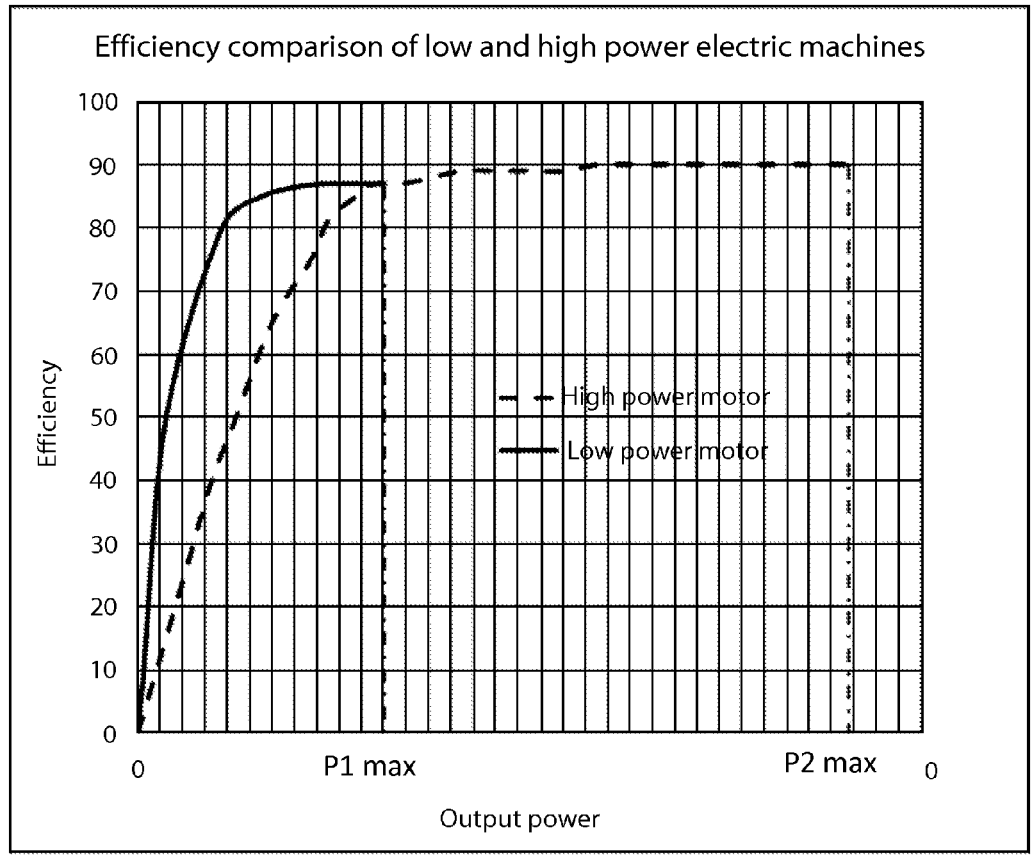
FIG. 6 shows efficiency comparison of typical low and high power electric machines.

FIG. 6 shows typical efficiency levels of low and high power cores of the machine. P1 max on this figure denotes the maximum output power of low output power core, while P2 max denotes the maximum output power of high output power core. These curves are typical for low and high power electric machines in general.

The disclosed machine can have three modes of operation.

The first mode is low output power mode. In this mode low output power core (say, comprising of stator 62, rotor 64 and part of stator 66) is mainly involved, so that the actuator 52 modulates the planetary gear set 40 at predetermined speed, at which the low power core operates at its highest possible efficiency at given torque and speed demand from the output shaft 24.

The actuator 54 at the same time modulates the planetary gear set 42 at such speed, so that the rotor 68 of higher output power core is not rotating, hence is not contributing to the performance of the machine.

The second mode is intermittent output power mode. In this mode both cores are working, while actuators 52 and 54 modulate the planetary gear sets 40 and 42 at predetermined speeds, so that each of the cores is working with highest possible efficiency at given torque and speed demand from the output shaft 24.

The third mode is similar to the first mode, but while only high power core is working. In this case actuator 52 modulates planetary gear set 40 at such speed, so that the rotor 64 is not rotating.

The controller which implements the control strategies is not shown on FIGS. 2-4.

Governing equations and one of the possible algorithms of operation of the controller are given below.

Let $Z_R$ and $Z_S$ be the number of teeth on the ring and planetary gears respectively.

Defining $k=Z_R/Z_S$ as a ratio between the number of teeth on the ring and sun gear, the speed equation is:

$$(k+1)\omega_C = k\omega_R + \omega_S \quad (1)$$

While C, R and S denote carrier, ring and sun gears respectively,

The power equation is:

$$P_M + P_A = P_O \quad (2)$$

Where M denotes the main electric machine of each core, which comprises of stators 62,66 and rotor 64 or stators 66,70 and rotor 68, A denotes the actuator and O stands for output shaft.

This equation means that the sum of powers going in to the planetary gear set is equal to the sum of powers going out from the same, assuming that losses in the planetary gear set are negligible.

Since power is a product of torque and speed, $$P = T*\omega$$

The equation (2) can be rewritten as:

$$T_M \omega_M + T_A \omega_A = T_O \omega_O \quad (3)$$

Torque on an output shaft is a sum of torques of each core, so that:

$$T_O = T_{C1} + T_{C2} \quad (4)$$

C1 and C2 stand for core 1 and core 2. It is important to note that the definition "core" includes the main stator and rotor as well as the actuator.

As it was mentioned above, one of the modes of operation of the electric machine is that one of the cores operates at very low or zero speed, being basically disconnected from the output shaft. As it can be seen with equation (1), assuming that the rotor of a particular core is connected to the ring gear and the control actuator is connected to the carrier, the speed of the actuator must satisfy:

$$\omega_A = \frac{\omega_O}{(k+1)} \text{ given that } \omega_M = 0 \quad (5)$$

At the same time, the torque of the actuator is given as:

$$T_{A1} = T_{C1} \frac{\omega_O}{\omega_{A1}} \quad (6)$$

Since the output torque of core 1 (same is applicable in case of core 2 rotating with small or zero speed) is negligible (most of the torque is supplied to the output shaft by core 2), the actuator torque is also small. The main requirement to the actuator in this case is the ability to provide the speed necessary to keep the rotor or core 1 at rest. The planetary gear set introduces losses to the system related to friction between the meshing teeth of gears, and these losses are translated to the ring gear in the form of small residual torque. In trying to counter-rotate the rotor of the core, it may happen that a small amount of torque should be applied by the core to the ring gear in order to compensate the residual torque.

One of the possible, but not limited, control algorithms is described below.

In this algorithm, the controller has preloaded performance maps of both cores and both actuators.

The overall efficiency of the electric machine is given as:

$$E_{TOT} = \frac{P_{C1}*E_{C1} + P_{C2}*E_{C2}}{P_{C1} + P_{C2}} \quad (7)$$

The controller input is the total torque $T_O$ and speed $\omega_O$ of output shaft 24.

Using equation (4), the controller forms a numerical array of possible torque contributions of each core, beginning with the case that torque contribution of one of the cores (say, core 1) is zero and adding small increments of h (called the integration step) until its maximum value is reached.

$$\overline{T}_{C1} = [0; 0+h; \ldots T_{C1MAX}]; \quad (8)$$

Therefore, the possible torque contribution of core 2 is:

$$\overline{T}_{C2} = T_O - \overline{T}_{C1} \quad (9)$$

Here, both torques are vector arrays, and h is the integration step which can be as small as possible in order to get more precise results.

The same can be done in regard to speed $\omega_O$, defining the possible speed contribution of each of the electric machines and actuators, according to (1). This can be written as:

$$\bar{\omega}_{M1} = [0; 0+h; \ldots \omega_{M1MAX}]; \quad (10)$$

$$\bar{\omega}_{M2} = [0; 0+h; \ldots \omega_{M2MAX}]; \quad (11)$$

$$\bar{\omega}_{A1} = \frac{k\bar{\omega}_{M1} + \omega_O}{k+1}; \quad (12)$$

$$\bar{\omega}_{A2} = \frac{k\bar{\omega}_{M2} + \omega_O}{k+1}; \quad (13)$$

Since the efficiency of each core is a function of torques and speeds of the actuator and main electric machine, the same equation (7) can be applied to calculate the efficiency of each $$\overline{E_{C1}} = \frac{\overline{P_{M1}} * \overline{E_{M1}} + \overline{P_{A1}} * \overline{E_{A1}}}{\overline{P_{M1}} + \overline{P_{A1}}} \quad (14)$$

This is the same for core 2, with efficiency values $E_{M1}$ and $E_{A1}$ taken from performance maps of the actuator and the main electric machine for each particular torque and speed value.

Total output power of each core is the sum of the output powers of its main electric machine and its actuator:

$$P_{C1} = P_{M1} + P_{A1} \quad (15)$$

$$P_{C2} = P_{M2} + P_{A2} \quad (16)$$

It is now possible to calculate the efficiency of each core for each T and $\bar{\omega}$ using equation (14) and substitute that efficiency to equation (7).

The last step is finding $E_{TOT\ MAX}$ of equation (7). The torques and speeds, corresponding to that maximum efficiency value are the torques and speeds at which the electric machine should be operated.

It is possible to use the same algorithm once, creating a performance map of the electric machine, loading that map into the controller's memory and extracting from the map torques and speeds of cores without calculating them each time.

Many other types of algorithms can be implemented for optimal control of the electric machine.

In some modes of operation, especially while the disclosed electric machine is working as a generator, it may occur that the planetary gear set actuator will perform as a generator, generating power, while no control power is applied to it. In this case, the generated electric power can be fed back to a grid or to the electric storage system of the motor/generator.

While the disclosed machine is operating as a generator, the electrical power for controlling the electrical actuators 52 and/or 54 can be supplied by one of the core stators 62, 66 or 70 and not by the energy storage device. In this case, relatively high initial torque (starting torque) should be applied to the common output shaft of the machine. Once the cores start rotating, electrical power is generated by them, and this power can be fed to the actuators through the controller.

The disclosed layout and design of the multi core electric machine is of a high degree of modularity. The cores can be interconnected, which allows for easy installation of additional cores, upgrading the motor/generator from a double-cored motor/generator to one with three or more cores.

Figure 7:
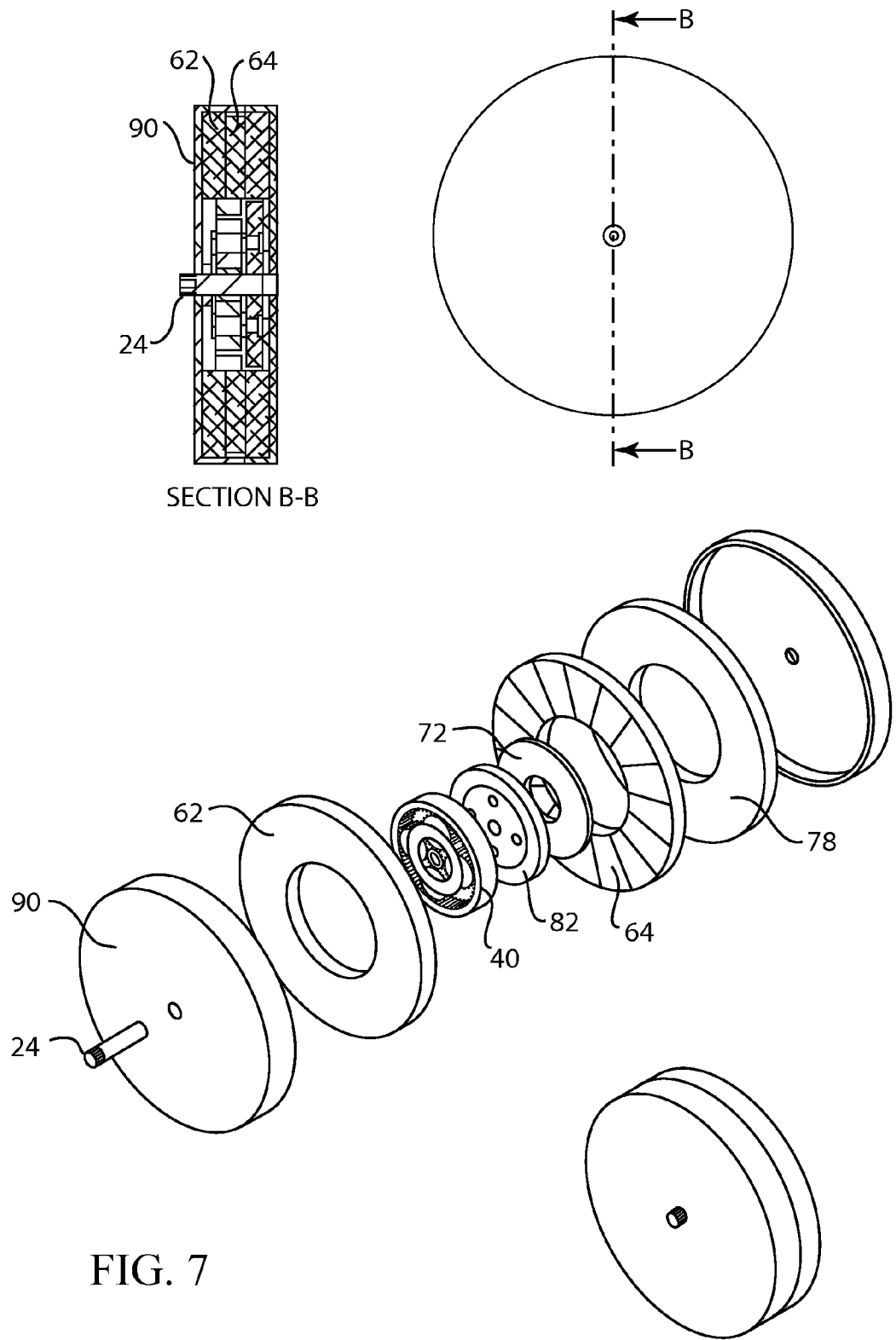
FIG. 7 shows a single module of the modular dual core electric machine.
Figure 8:
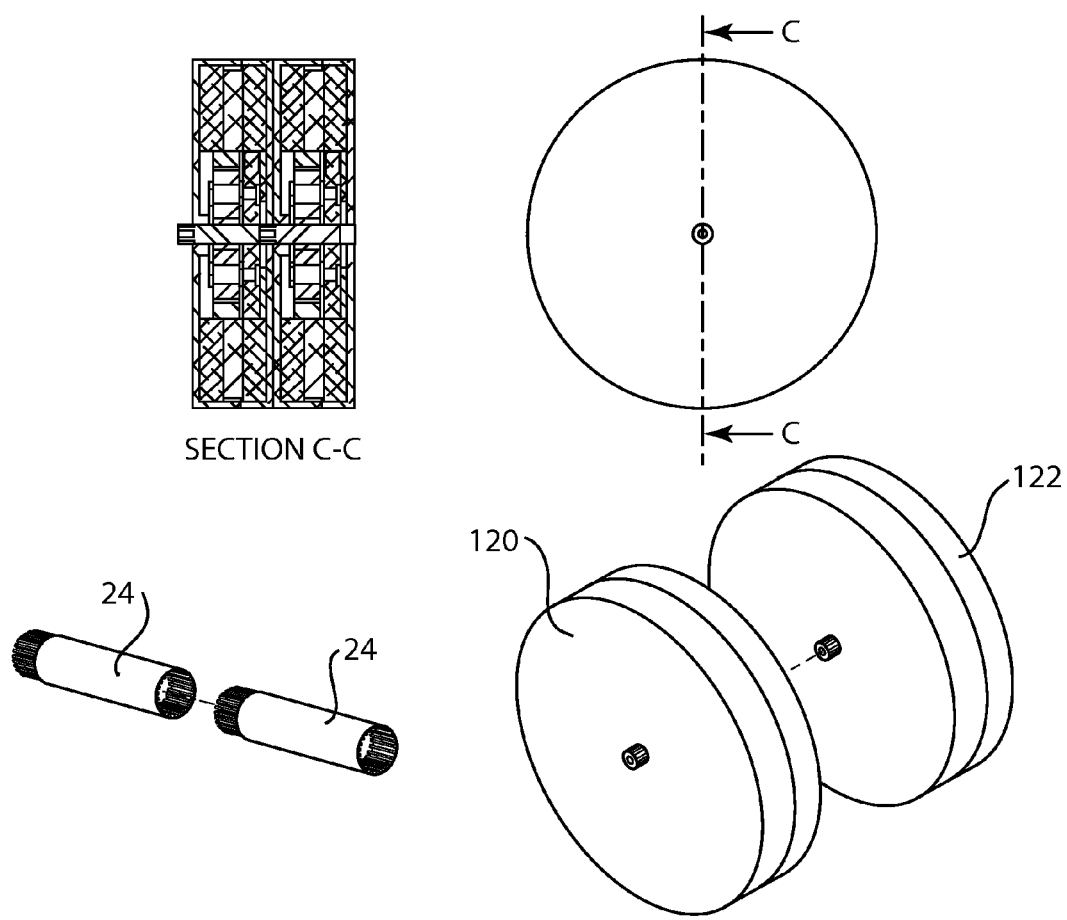
FIG. 8 shows two modules connected together, forming a dual core electric machine.

The abovementioned modular machine is shown in FIGS. 7 and 8.

FIG. 7 shows a single core, electric machine, which comprises a housing 90, a first stator 62, a rotor 64, and a second stator 78. The ring gear of planetary gear set 40 is connected to rotor 64. Rotor 82 of actuator 52 is connected to the carrier of planetary gear set 40, while the stator of actuator 52 is rigidly connected to stator 78. The stators 62 and 78 are rigidly connected to the housing 90. Output shaft 24 is connected to the sun gear of planetary gear set 40.

FIG. 8 shows two independent cores 120 and 122 (shown in FIG. 7) that are connected together, forming a double core, electric machine disclosed above.

In this case, the output shaft of the first core should have an interface, allowing quick connection of additional cores. The interface can consist of reciprocal recesses on the shafts, as it is shown in FIG. 8. Electrical connector interfaces are not shown in FIG. 8 however they can be quick-release connectors of any appropriate type.

In this embodiment, each core is totally separated from the rest of the system, having its own separate enclosure and electrically-actuated CVT (as the one described above) embedded into it. Moreover, control electronics can also be embedded into each core, so that each core can operate as a stand-alone, electric machine, but while connected mechanically with other cores, would form a multi core, electric machine as the one described above.

As an option each of the modular cores can be housed in a single common housing, still being of modular type and having electrical and mechanical interface, as described above. Moreover, the modular core can be part of bigger plant and housed in its housing, still being of modular type. In this case the modularity function adds serviceability and upgradability of the system.

Each of the cores can have rotors of different size or magnets with different magnetism. Each of the stators can be of different size or different inductance. As it was noted, number of rotors and stators is not limited to one disclosed above, and is a function of particular application.

Below are descriptions of some of the applications of the disclosed arrangement. These applications are given as examples and are not limiting in any way other applications of the above disclosed arrangement.

Hybrid Electric Drive Train

Figure 9:
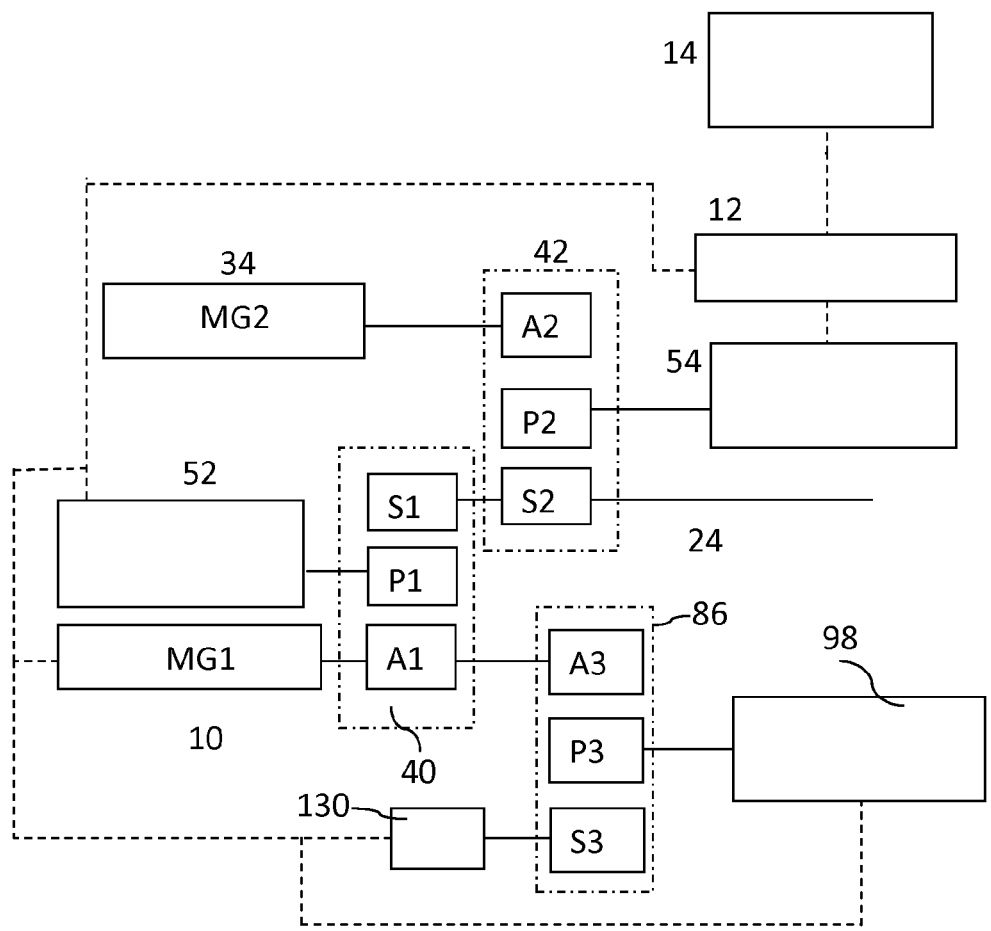
FIG. 9 shows the first configuration of hybrid electric drive train configuration, using dual core electric machine.

FIG. 9 shows an application of the double core, electric machine as a core part of a hybrid electric drive train.

The system consists of internal combustion engine 130 connected through a single, electrically-actuated planetary gear set 86 of the type described above, while ring gear A3 of planetary gear set 86 is connected to ring gear A1 of planetary gear set 40, which is in turn connected to MG1 10. The third electric actuator 98 is connected to sun gear S3 of planetary gear set 86, and carrier P3 of the same planetary gear set 86 is connected to the output shaft of ICE 130. More specifically, the same embodiment can be implemented using the double core, electric machine disclosed above. In this case, MG1 10 represents one of the cores which either includes stators 66, 70 and rotor 68, or stators 62, 66 and rotor 64, while MG2 34 represents the other core.

An example of modes of operation of the drive train system is described below.

Modes of Operation:

1) Charging Mode, Low Acceleration

In this mode, MG1 10 is connected to ICE 130 by planetary gear set 86. The actuator of the planetary gear set 86 rotates at a predetermined speed, so that the rotation of ICE 130 is transmitted to the output member of the planetary gear set 86

Figure 17:
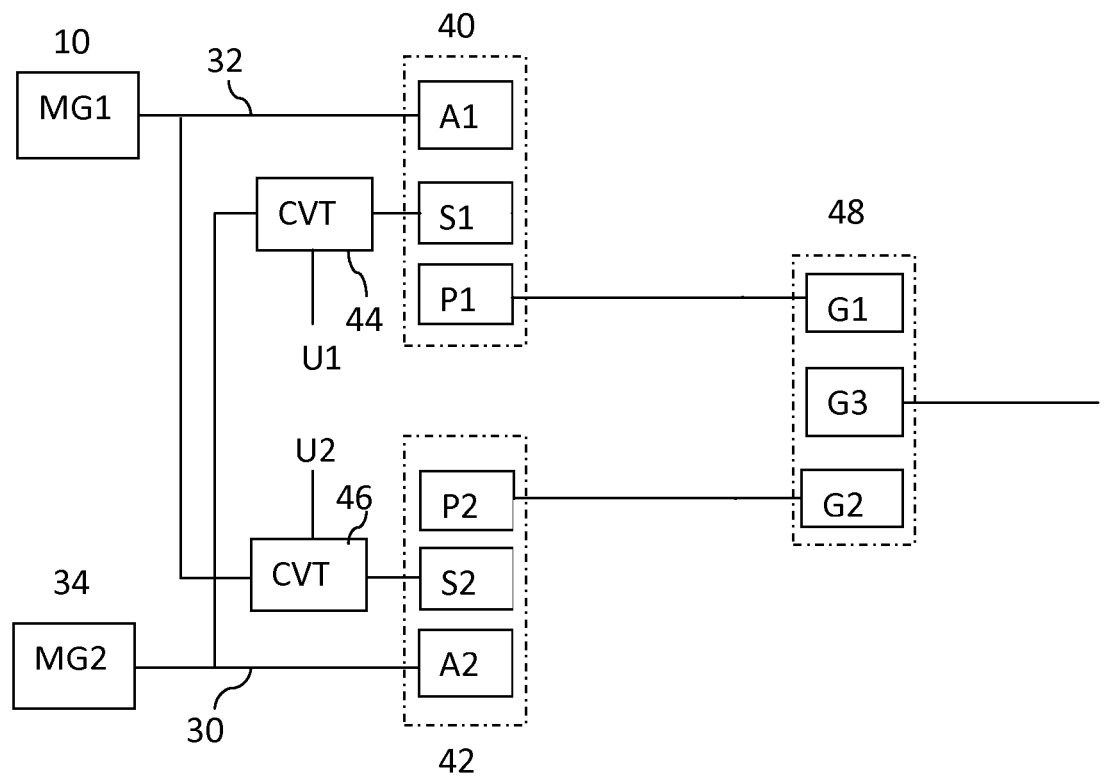
FIG. 17 shows connection of two motor/generators to a single common output shaft, incorporating planetary gear sets, while mechanical CVTs are cross connected to the opposite electric machines.

(in the example of FIG. 17, the output member is the ring gear A3). Changing the rotational speed of carrier P3, electric actuator 98 changes the transmission ratio of planetary gear set 86, hence the operation point of connection between MG1 10 and ICE 130. If no connection is needed between ICE 130 and MG1 10, actuator 98 should rotate at a speed which is fast enough to restrain the input member (shaft of ICE 130) from rotation, relative to output member A3.

Speed and torque of actuator 52 should satisfy equation (18) presented below, so that MG1 10 is driven by ICE 130, and the power supplied by ICE 130 to MG1 10 does not flow to the output shaft 24, basically disconnecting MG1 10 from the common output shaft 24. Hence, MG1 10 is working as a generator, feeding the generated electric power to the energy storage device 14 through controller 12.

The power equation of planetary gear set 40 for the charging mode, described above, is:

$$T_{MG1}\omega_{MG1} + T_{A52}\psi_{A52} = T_O\omega_O \qquad (17)$$

Subscript MG1 denotes the torque and speed of motor/generator 10, and A52 denotes the torque and speed of actuator 52.

If power does not flow to output shaft 24, the right side of equation (17) is equal to zero.

Hence, combining equation (17) with equation (1), one can get the following condition to restrain the power flowing to shaft 24:

$$k\left(1 + \frac{T_{A52}}{T_{MG1}}\right) = \frac{\omega_O}{\omega_{A52}} - 1 \qquad (18)$$

Subscript O denotes the speed of output shaft 24.

The MG1 10 can work as a starter, starting the ICE 130, and then it can work as generator, as described above.

At the same time, MG2 34 can work independently of MG1 10, providing power to the vehicle wheels through output shaft 24.

2) Traction Mode, High Acceleration

In this mode, ICE 130, MG1 10 and MG2 34 are connected to the wheels through output shaft 24 and work simultaneously. MG1 10 and MG2 34 are working as electric motors.

Electric actuators 52, 54 and 98 operate at a speed predetermined by controller 12, so that MG1 10, MG2 34 and ICE 130 all work at the highest efficiency point.

3) Full Electric Vehicle Mode

In this mode, electric actuator 98 rotates at a speed (defined by equation (1)) so that ICE 130 is disconnected. Both MG1 10 and MG2 34 (or both cores of the electric machine) are connected to output shaft 24 and are working as electric motors.

4) Regenerative Braking Mode

In this mode, one of the cores or electric machines MG1 10 or MG2 34 is working as a generator, recovering power which is supplied by output shaft 24. If the power level on shaft 24 exceeds peak power of MG1 10 or MG2 34, then the other of MG1 10 or MG2 34 should be connected to shaft 24.

In all of these cases, the actuators 52, 54 and 98, both motors/generators 10 and 34 and ICE 130 are constantly controlled by a controller, so that each of the motors/generators and the ICE 130 work at the most efficient possible point, depending on the power demand from the driver.

Figure 10:
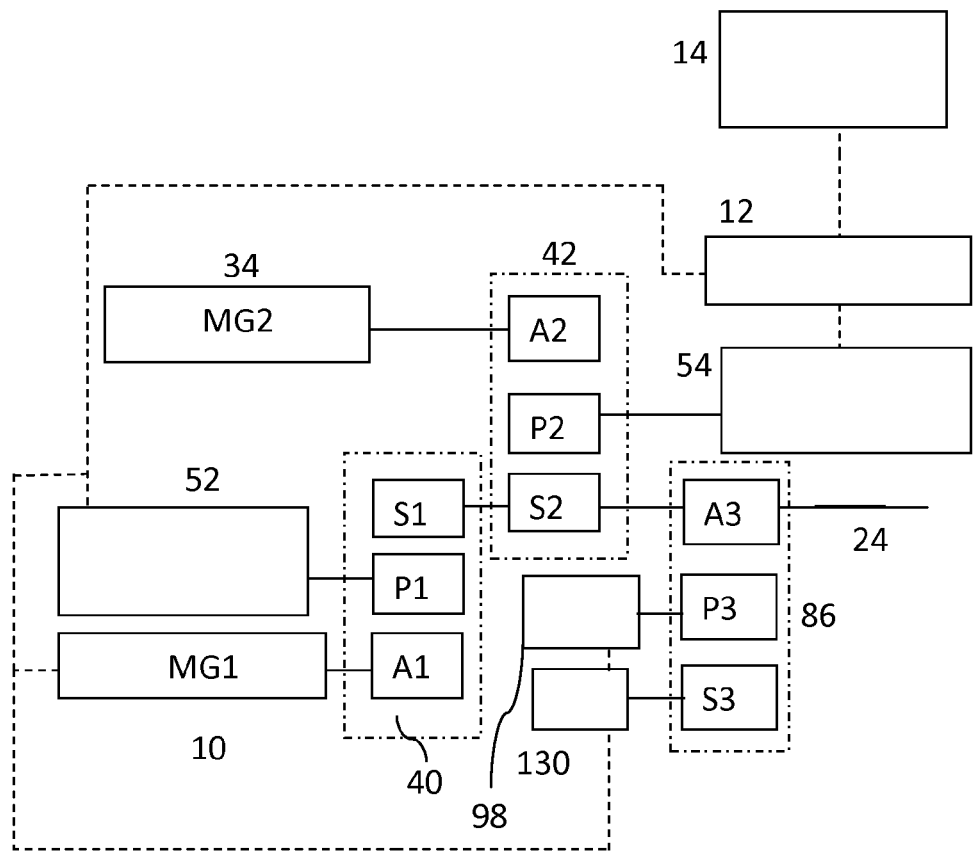
FIG. 10 shows the second configuration of hybrid electric drive train configuration, using dual core electric machine.

Another embodiment of the hybrid electric drive train is shown on FIG. 10. In this embodiment the output shaft of ICE 130 is connected to the sun gear S3 of planetary gear set 86, which is controlled by actuator 98. The ring gear A3 is connected to the output shaft 24 and the actuator 98 is connected to the carrier P3.

Modes of operation of this embodiment can be identical to previous. The main difference is that in charging mode the ICE 130 is connected to the output shaft 24 by operation of actuator 98, supplying power to said output shaft. Controlling speed of actuator 52 or 54 it is possible to redirect portion of that power to MG1 10 or MG2 34 respectively, so that one of these machines works as generator, charging the energy storage device 14.

Wind Turbine Power Plant

The embodiment shown on FIG. 2 can be used as wind turbine power plant. In this case, both Motor/Generator 1 10 and Motor/Generator 2 34 work as generators only. The output shaft 24 is connected to the propeller (not shown) of the wind turbine. In this application controller 12 changes the transmission ratio of each planetary gear set 40 and 42 in such a way that each of the generators works at the highest possible efficiency point.

The above disclosed arrangements are not limited to the abovementioned applications and can be used in many other applications. For instance the multi core electric machine can be used as a multi core stepper motor, while stators and rotors 62,64,66,68 and 70 are stators and rotors of stepper motor type. In this case greater overall precision of the machine can be achieved.

Other possible embodiments of multi core machines are described below. These embodiments involve greater number of purely mechanical components and might be cheaper for production.

Figure 11:
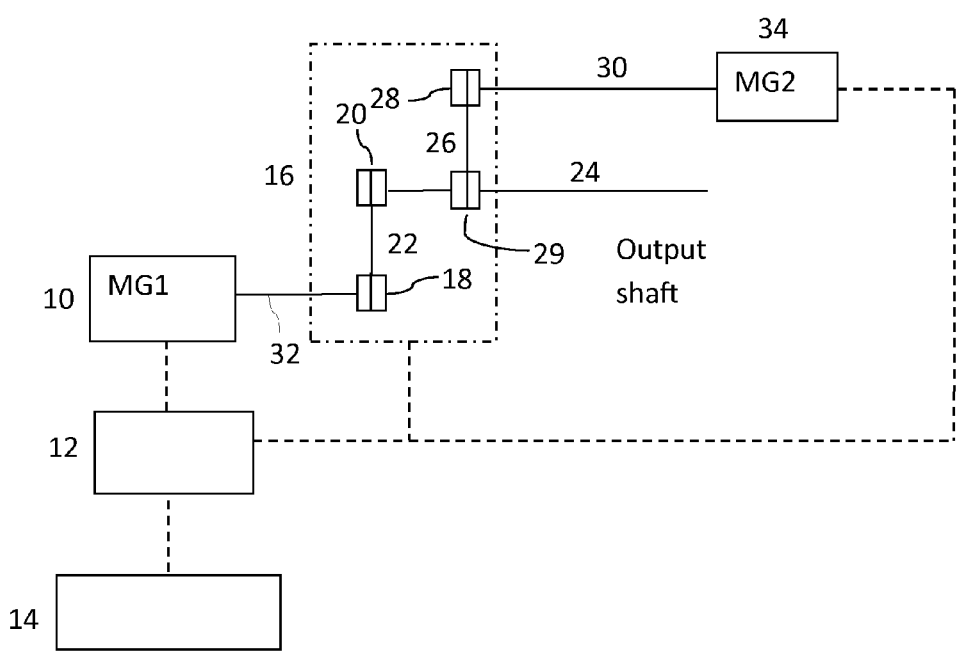
FIG. 11 shows an embodiment, which comprises two electric motors/generators and two push belt type CVTs connected together.

The next embodiment is a simple arrangement of two electric machines into a single output device, shown on FIG. 11. This embodiment is comprised of two electric machines of different output power ratings or different torque-speed characteristics. However, the same principle is applicable for three or more machines, depending on the particular application.

Figure 12:
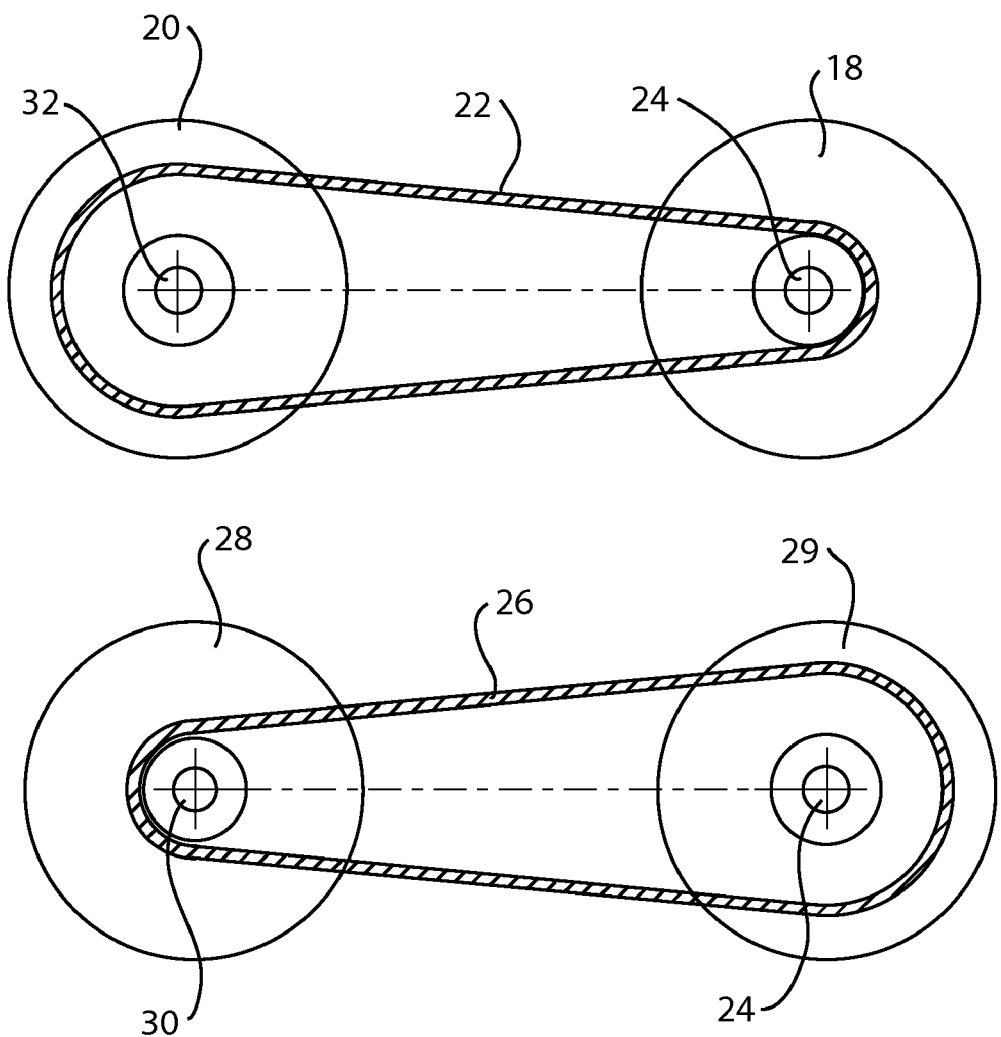
FIG. 12 shows the principle of operation and connections of push belt type CVTs.

The base block on FIG. 11 is comprised of a housing 16, which houses two belt-type, continuously-variable transmissions. The first transmission consists of a first pulley 18, a second pulley 20 and a belt 22, which is interconnected with both the first and second pulleys, so that the rotation of pulley 20 is transmitted to pulley 18 through belt 22 and vice versa, as it is shown on FIG. 12. Pulley 18 is rigidly connected to output shaft 32 of the first motor/generator 10, while pulley 20 is rigidly connected to output shaft 24. The second continuously-variable transmission consists of pulley 29, which is rigidly connected to the output shaft 24, and pulley 28, which is rigidly connected to shaft 30 of the second electric motor/generator 34. The second belt 26 is interconnected with pulley 28 and pulley 29 so that rotation of pulley 28 is transmitted to pulley 29, or vice versa, by the second belt 26, as it is shown on FIG. 12.

Both MG1 and MG2 and the CVTs are controlled by controller 12.

Pulleys 18, 20, 28, and 29 have the means (not shown) to change their diameters relatively to the pulleys at any given point in time. Changing diameters leads to a change in the transmission ratios of respective pairs of pulleys. For instance, changing radiuses of pulleys 28 and 29 would change the transmission ratio of shaft 34 respectively to output shaft 24. The means to change pulley diameters are well known in the arts and are widely used in light vehicles such as scooters.

The controller 12 can implement different control strategies, depending on the application of the base block and output characteristics of the entire plant which uses the base block. For instance, it can receive the torque and speed demands for the entire system from the user, and based on memory performance curves of MG1, MG2 and both CVTs preloaded into the controller's memory, operate each of the MG1, MG2 and CVTs at the most efficient operation point of the system.

The energy storage device 14 is a battery bank or any other energy storage device, for example, a bank of ultracapacitors. It is possible to use a local grid instead of the energy storage device if needed.

As it is described above, each of the electric machines has its own dedicated CVT, so that it is possible to control each of the CVT devices separately with the controller block. This allows for greater control over output characteristics of the arrangement.

It is important to emphasize that the disclosed system can work in two directions, performing as a motor or a generator. Therefore, in this paper, "output shaft" means the same for a combination of electric machines working as motors. For a combination of electric machines working as generators, the "output shaft" means a mechanical input shaft.

First, it can supply mechanical power to the output shaft 24, converting it from electrical energy supplied by the energy storage device 14.

Second, it can convert mechanical power (applied to the output shaft 24) into electrical power, supplying said electrical power to the energy storage device 14 or to a grid, if a grid is connected instead of the energy storage device.

Figure 13:
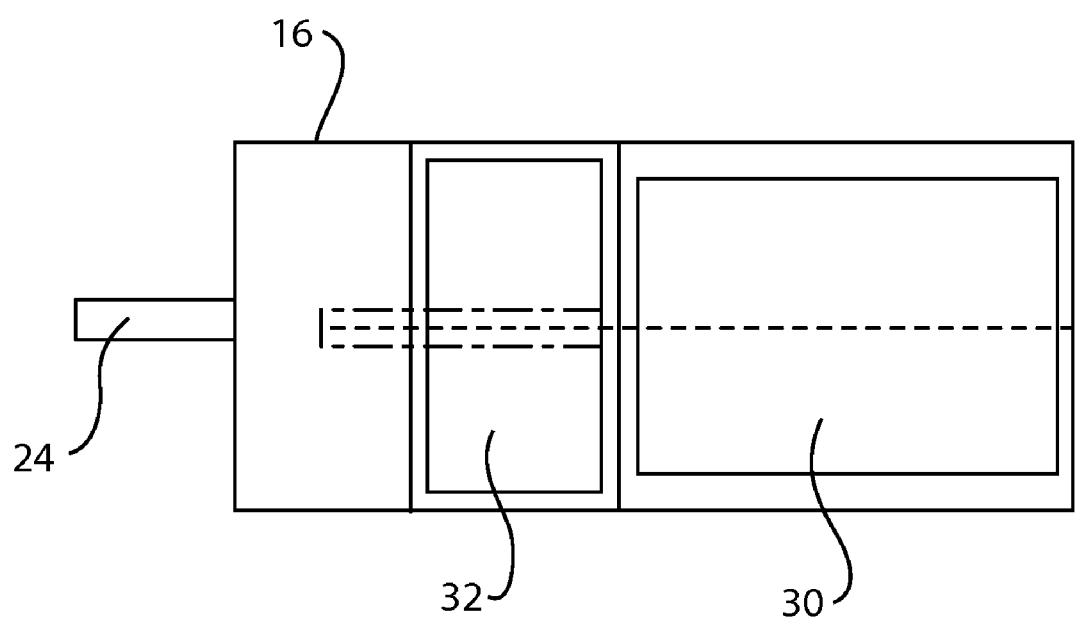
FIG. 13 shows arrangement of electric motors/generators in one enclosure.

It is possible to combine both electric machines and both CVTs in one enclosure as it is shown on FIG. 13. This type of arrangement basically allows the creation of a multi-core electric motor, where each core is independent of another and connected to one common output shaft through a CVT. The CVT block is compactly contained in the common enclosure. The output shafts of each core are coaxial and hollow (except for the innermost shaft).

FIG. 6 shows typical efficiency levels of low and high power machines. P1 max on this figure denotes the maximum output power of a low-power machine, while P2 max denotes the maximum output power of a high-power machine.

Turning back to the description of the first embodiment in FIG. 11, there are three possible modes of operation for the device, which are similar to these, described in relation to the embodiment in FIG. 1.

First, while required output power on the common shaft is low, the transmission ratio of a CVT, connected to the high-power, electric machine can be as small as possible, so that rotation of the common output shaft 24 is almost not transmitted to the electric machine 10 and participation of the electric machine 10 in producing overall output power is very limited, assuming that electric machine 10 is the high-power machine. In this case, low-power electric machine 34 is connected to the common output shaft through its CVT (which includes pulleys 28, 29 and belt 26), and that CVT is modulated by controller 12, so that electric machine 34 provides required speed and torque to the output shaft 24, at the same time operating at a level of highest possible efficiency. For instance, if the torque, required on output shaft 24 is high and the required speed of the same is low, the electric machine 34 can provide low torque and high speed on its output shaft 30, while the CVT associated with it, converts it to the torque and speed of output shaft 24. This is beneficial in terms of efficiency, since many DC electric machines work more efficiently providing lower torque but higher speed.

Second, if high or maximum possible output power is required on output shaft 24, both of the electric machines 10 and 34 can operate and supply power to the common output shaft 24, while the contribution of each electric machine can be controlled by the respective CVT and respective power input. The control function is done by controller 12.

Third, if output power, required on output shaft 24 is within the upper range of electric machine 10 (while it is working more efficiently than machine 34 or both 10 and 34 combined), the participation of electric machine 34 can be minimized by limiting its input power and decreasing transmission ratio of its CVT (which includes pulleys 28, 29 and belt 26).

In general, these three modes of operation allow superimposing the characteristics of both electric machines 10 and 34 in terms of efficiency and output torque speed relativity.

There are many other possibilities for arrangement of the electric machines with many different types of machines, including axial flux machines, DC (direct current) or AC (alternate current) machines, permanent magnet machines and many others. One of these arrangements can include an AC machine as a less powerful core and a DC machine as a more powerful core. In such an arrangement, an AC machine would work at low output power levels, while the DC machine (or both machine together) would work at high output power levels. This configuration allows for the reduction of overall system cost, since typically more powerful AC controllers are also more expensive. In this configuration, only a low-power AC controller is used, and typically a lower stage (less powerful electric machine) would be a more efficient one. This is beneficial because the machine is working mainly at low output powers and only occasionally supplying high (peak) output power.

Another possible configuration is the usage of two AC machines in lower (less powerful machine) and upper (more powerful machine) stages, but in this case, one of the stages (lower or upper, depending on the application and typical duty cycle of the application) can be constructed using relatively expensive, rare-earth magnets, while the other core can be constructed using less expensive magnets. This would greatly reduce the overall system cost, keeping system efficiency high at needed output power levels.

The above disclosed embodiment is very simple and inexpensive machine.

It might be desirable to increase transmittable through the push belt CVTs torque. The following embodiments allow for increased transmittable torque and speed.

These configurations can be seen on FIGS. 14-17.

Figure 14:
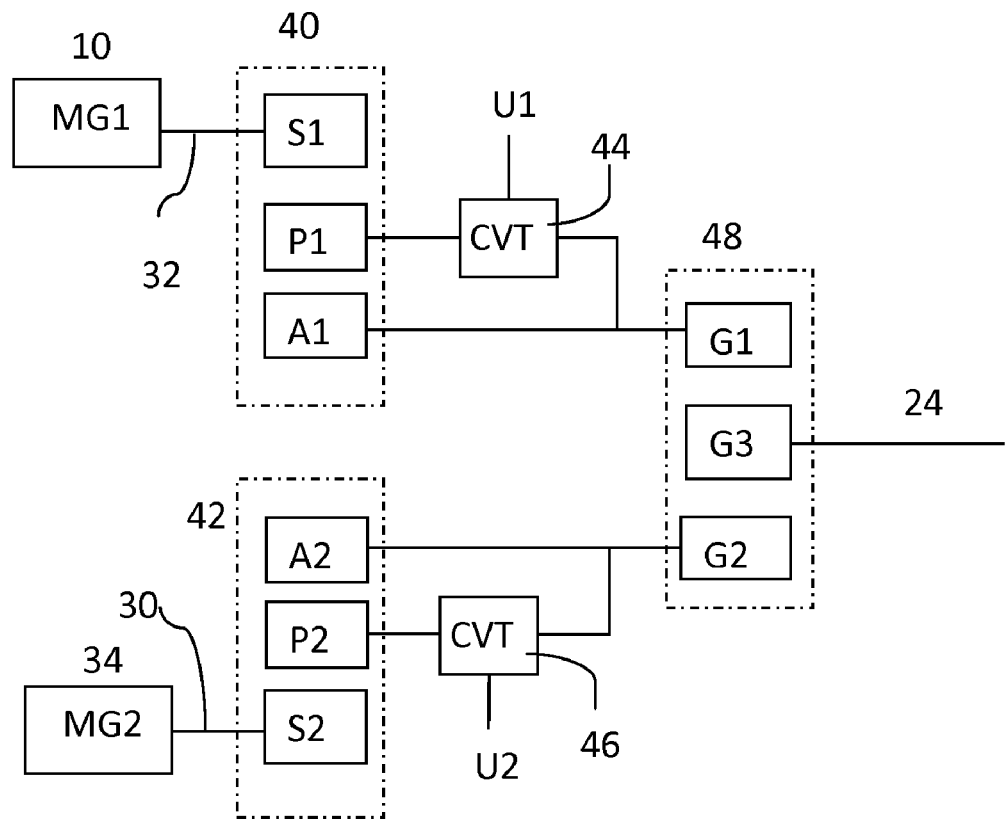
FIG. 14 shows connection of two motor/generators to a single common output shaft, incorporating planetary gear sets, while mechanical CVTs are connected to planet gears.

The configuration in FIG. 14 consists of two electric motors/generators 10 and 34 (of different power ratings or different output characteristics) which are connected through output shafts (in case of motors, and in case of generators, input shafts) 30 and 32 to a pair of planetary gear sets 40 and 42. The first planetary gear set 40 and the second planetary gear set 42 are comprised of a rotatable sun gear S, a set of planet gears which are meshing with the sun gear, a carrier connected to all of the planet gears (marked on the figures as P), and a ring gear (or so called annulus) which meshes with each of the planet gears (marked on the drawings as A). Numbers aside each of the letters S, P and A denote a respective planetary gear set, e.g. S1 is the sun gear of the first planetary gear set 40.

The output shaft 30 of motor/generator 10 is connected to the sun gear S1 of the planetary gear set 40, and the output shaft 32 of motor/generator 34 is connected to the sun gear S2 of the planetary gear set 42. The ring A1 of planetary gear set 40 and the ring A2 of planetary gear set 42 are connected to gears G1 and G2 respectively of a differential gear box 48. The differential gear box 48 consists of three interconnected gears G1, G2 and G3.

It is possible to connect the ring gears A1 and A2 directly and rigidly to the output shaft 24 without usage of differential gear box, depending on the particular design and application.

The carriers P1 and P2 of the planetary gear sets 40 and 42 are connected to the ring gears A1 and A2 respectively through mechanical CVTs 44 and 46. The push-belt CVT described above can be used as well as any other type of mechanical CVT.

Since the electric machines 10 and 34 are of different types, it is best that the planetary gear sets 40 and 42 are also of different types, so that maximum power transmitted through these planetary gear sets matches the maximum power of the respective electric machines.

During the operation of the device, while output shafts 30 and 32 of electric machines 10 and 34 are rotating, respective planetary gears are transmitting the rotation and the torque from the electric machines to the output shaft, rotating gears P1, P2, A1, and A2. While ring gears A1 and A2 are rotating, the respective CVTs 44 and 46 transmit the rotation and part of the torque back to carriers P1 and P2. Change of transmission ratio of each CVT by the respective control signals U1 and U2 coming from the controller (not shown in FIGS. 14-17), changes the transmission ratio of the respective planetary gear set by changing rotational speeds of carriers P1 and P2 so that carriers P1 and P2 modulate the transmission ratios of the respective planetary gear sets.

Therefore, it is possible to combine speeds and torques of electric machines 10 and 34, combining their output characteristics according to the controller's input signals U1 and U2. In the case that electric machines 10 and 34 are generators, it is possible to split the input torque and speed of shaft 24 between machines 10 and 34, according to the controller's input signals U1 and U2.

Figure 15:
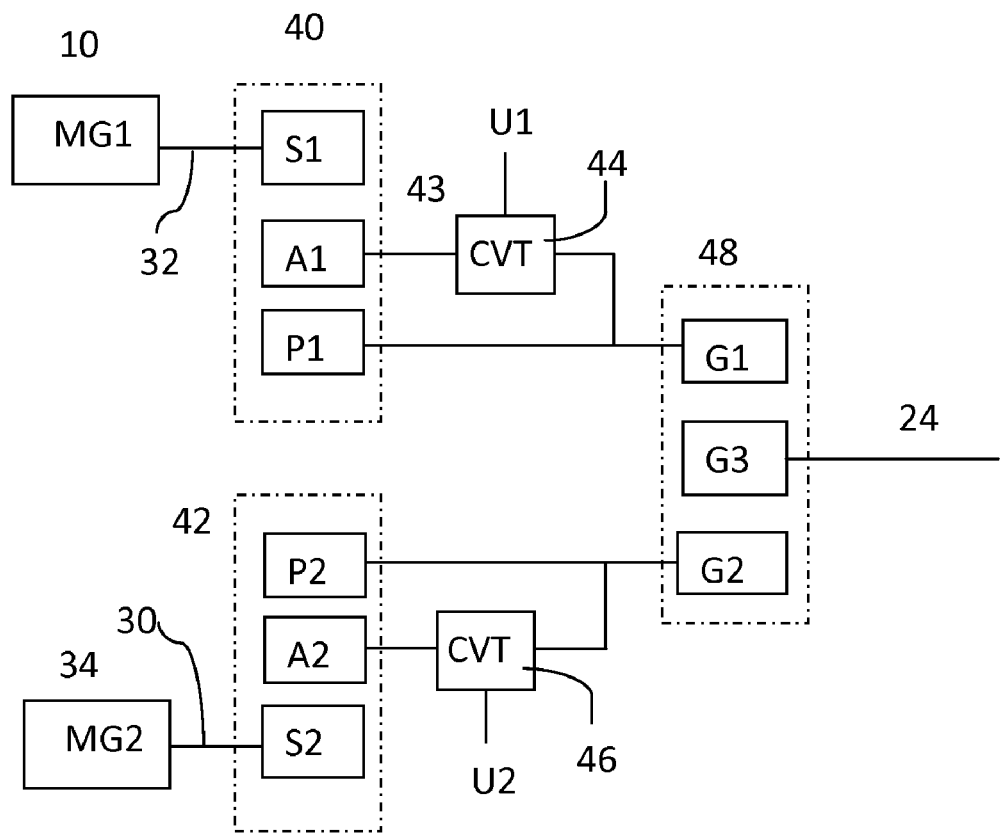
FIG. 15 shows connection of two motor/generators to a single common output shaft, incorporating planetary gear sets, while mechanical CVTs are connected to ring gears.
Figure 16:
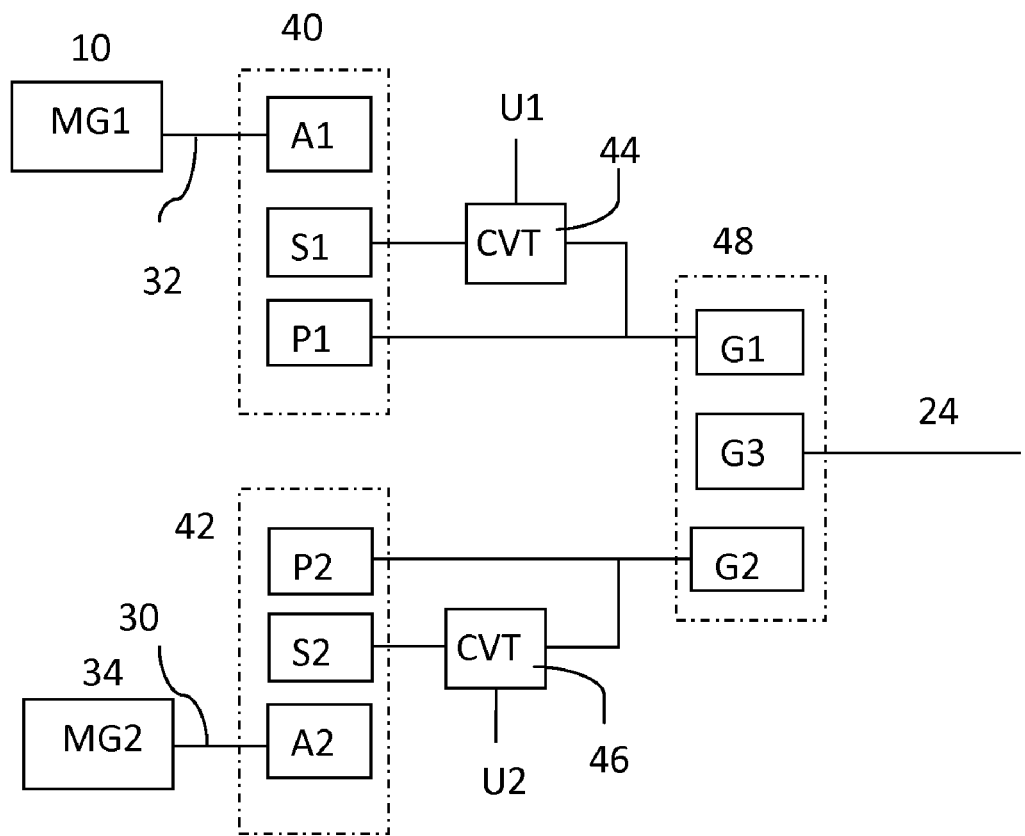
FIG. 16 shows connection of two motor/generators to a single common output shaft, incorporating planetary gear sets, while mechanical CVTs are connected to sun gears.

FIGS. 15-17 show variations of the configuration shown on FIG. 14. The difference is in the connection of the CVTs to the different members of respective planetary gear sets. Each configuration is useful for a particular application.

FIG. 15 shows connection of CVTs 44 and 46 to ring gears A1 and A2 of the planetary gear sets 40 and 42 and FIG. 16 shows connection of CVTs to sun gears S1 and S2 of planetary gear sets 40 and 42.

FIG. 17 shows variation of configuration shown in FIG. 14, with mechanical CVTs cross connected to respective electric machines. The modulating members of planetary gear sets 40 and 42 are cross-connected to the second motor/generator 34 through the CVT 44 and the first motor/generator 10 through the CVT 46 respectively. In this case, modulation of the first planetary gear set 40 is made by the motor/generator 34 and CVT 44, and modulation of the second planetary gear set 42 is made by the motor/generator 10 and CVT 46.

The configurations shown in FIGS. 14-17 separate the power flow into two: one is the main power flow, which flows through the planetary gear sets, and the other is the control power flow, which flows through mechanical CVTs 44 and 46 of any kind, including a push-belt type CVT as described above.

The advantage of such power separation lies in relatively low power losses through transmissions, since the power flow is separated into two paths and only a portion of power flows through the CVTs.

In such power-split configurations, the CVTs can be low-torque transmitting types. Efficiency of these CVTs is not very critical in many applications, which makes it possible to use inexpensive types of CVTs.

The configurations shown on FIGS. 14-17 are not limited so many other types of connections can be implemented. For example, shaft 32 of MG1 can be connected to the ring gear A1 of planetary gear set 40, while the shaft 30 of MG2 can be connected to the sun gear of planetary gear set 42. The decision depends on the particular application, control methods and algorithms.

In one embodiment of the invention, an electric machine for use with an energy storage device is provided and includes a housing, a first rotor and a first stator electrically interactable with the first rotor carried within the housing, a second rotor and a second stator electrically interactable with the second rotor carried within the housing, a rotatable shaft carried by the housing and extending from the housing, a first continuously variable transmission including a first rotatable element, a second rotatable element and a mechanism for controlling the ratio of the rotation of the second element to the rotation of the first element, the first element of the first continuously variable transmission connected to the first rotor so that the first rotor rotates one-to-one with the first element and the second element of the first continuously variable transmission connected to the rotatable shaft of the electric machine so that the rotatable shaft rotates one-to-one with the second element, a second continuously variable transmission including a first rotatable element, a second rotatable element and a mechanism for controlling the ratio of the rotation of such second element to the rotation of such first element, the first element of the second continuously variable transmission connected to the second rotor so that the second rotor rotates one-to-one with such first element and the second element of the second continuously variable transmission connected to the rotatable shaft of the electric machine so that the rotatable shaft rotates one-to-one with such second element, and a controller electrically coupled to the first rotor and first stator and first mechanism and to the second rotor and second stator and second mechanism so as to modulate the rotation of the second element relative to the rotation of the first element of each of the first and second continuously variable transmissions for controlling the contributions of the first rotor and the second rotor to the rotatable shaft so as to enhance the efficiency of the electric machine.

The first continuously variable transmission can include a first planetary gear set having a rotatable first sun gear, a rotatable first ring gear and a plurality of first planet gears carried by a first carrier between the first sun gear and the first ring gear and rotatably engaging the first sun gear and the first ring gear. The first element of the first continuously variable transmission can be one of the first sun gear, the first ring gear and the first carrier. The second element of the first continuously variable transmission can be a second of the first sun gear, the first ring gear and the first carrier. The mechanism of the first continuously variable transmission can include a third of the first sun gear, the first ring gear and the first carrier and a first actuator carried by the housing and coupled to the third of the first sun gear, the first ring gear and the first carrier so as to modulate the rotation of the one of the first sun gear, the first ring gear and the first carrier relative to the rotation of the second of the first sun gear, the first ring gear and the first carrier over a continuous first range. The second continuously variable transmission can include a second planetary gear set having a rotatable second sun gear, a rotatable second ring gear and a plurality of second planet gears carried by a second carrier between the second sun gear and the second ring gear and rotatably engaging the second sun gear and the second ring gear. The first element of the second continuously variable transmission can be one of the second sun gear, the second ring gear and the second carrier. The second element of the second continuously variable transmission can be a second of the second sun gear, the second ring gear and the second carrier. The mechanism of the second continuously variable transmission can include a third of the second sun gear, the second ring gear and the second carrier and a second actuator carried by the housing and coupled to the third of the second sun gear, the second ring gear and the second carrier so as to modulate the rotation of the one of the second sun gear, the second ring gear and the second carrier relative to the rotation of the second of the second sun gear, the second ring gear and the second carrier over a continuous first range.

The first actuator can be an electrical actuator or a mechanical actuator and the second actuator can be an electrical actuator or a mechanical actuator. The first actuator can be a third continuously variable transmission including a first rotatable element, a second rotatable element and a mechanism for controlling the ratio of the rotation of the second element to the rotation of the first element, the first element of the third continuously variable transmission being coupled to the one of the first sun gear, the first ring gear and the first carrier of the first planetary gear set and the second element of the third continuously variable transmission being coupled to the third of the first sun gear, the first ring gear and the first carrier of the first planetary gear set. The second actuator can be a fourth continuously variable transmission including a first rotatable element, a second rotatable element and a mechanism for controlling the ratio of the rotation of the second element to the rotation of the first element, the first element of the fourth continuously variable transmission being coupled to the one of the first sun gear, the first ring gear and the first carrier of the second planetary gear set and the second element of the fourth continuously variable transmission being coupled to the third of the first sun gear, the first ring gear and the first carrier of the second planetary gear set.

The first continuously variable transmission can include a first planetary gear set having a rotatable first sun gear, a rotatable first ring gear and a plurality of first planet gears carried by a first carrier between the first sun gear and the first ring gear and rotatably engaging the first sun gear and the first ring gear. The first element of the first continuously variable transmission can be one of the first sun gear, the first ring gear and the first carrier. The second element of the first continuously variable transmission can be a second of the first sun gear, the first ring gear and the first carrier. The mechanism of the first continuously variable transmission can include a third of the first sun gear, the first ring gear and the first carrier and a first actuator carried by the housing. The second continuously variable transmission can include a second planetary gear set having a rotatable second sun gear, a rotatable second ring gear and a plurality of second planet gears carried by a second carrier between the second sun gear and the second ring gear and rotatably engaging the second sun gear and the second ring gear. The first element of the second continuously variable transmission can be one of the second sun gear, the second ring gear and the second carrier. The second element of the second continuously variable transmission can be a second of the second sun gear, the second ring gear and the second carrier. The mechanism of the second continuously variable transmission can include a third of the second sun gear, the second ring gear and the second carrier and a second actuator carried by the housing. The first actuator can be coupled to the third of the first sun gear, the first ring gear and the first carrier so as to modulate the rotation of the one of the second sun gear, the second ring gear and the second carrier relative to the rotation of the second of the first sun gear, the first ring gear and the first carrier over a continuous first range. The second actuator can be coupled to the third of the second sun gear, the second ring gear and the second carrier so as to modulate the rotation of the one of the first sun gear, the first ring gear and the first carrier relative to the rotation of the second of the second sun gear, the second ring gear and the second carrier over a continuous first range.

The first actuator can be a third continuously variable transmission including a first rotatable element, a second rotatable element and a mechanism for controlling the ratio of the rotation of the second element to the rotation of the first element. The first element of the third continuously variable transmission can be coupled to the one of the second sun gear, the second ring gear and the second carrier of the first planetary gear set and the second element of the third continuously variable transmission can be coupled to the third of the first sun gear, the first ring gear and the first carrier of the first planetary gear set. The second actuator can be a fourth continuously variable transmission including a first rotatable element, a second rotatable element and a mechanism for controlling the ratio of the rotation of the second element to the rotation of the first element. The first element of the fourth continuously variable transmission can be coupled to the one of the second sun gear, the second ring gear and the second carrier of the second planetary gear set and the second element of the fourth continuously variable transmission can be coupled to the third of the first sun gear, the first ring gear and the first carrier of the second planetary gear set.

The second rotor can be larger than the first rotor and the second stator can be larger than the first stator. The second rotor can be larger than the first rotor by a proportion and the second stator can be larger than the first stator by the proportion.

The first rotor and first stator and the second rotor and second stator can be coaxial. The electric machine can further include a third stator coaxial with and disposed between the first rotor and the second rotor, the third stator electrically interacting with both the first rotor and the second rotor and electrically coupled to the controller, the first stator being disposed outside the first rotor and the second stator being disposed outside the second rotor.

The first rotor and first stator can be configured for one of alternating current and direct current electrical interaction and the second rotor and second stator can be configured for one of alternating current and direct current electrical interaction. The first rotor and first stator can be configured for alternating current electrical interaction and the second rotor and second stator can be configured for direct current electrical interaction.

The electric machine can be a motor, a generator or a combination motor and generator.

A hybrid engine can be provided and include an internal combustion engine having an output shaft. A third planetary gear set can be provided and have a rotatable third sun gear, a rotatable third ring gear and a plurality of third planet gears carried by a third carrier between the third sun gear and the third ring gear and rotatably engaging the third sun gear and the third ring gear. One of the third sun gear, the third ring gear and the third carrier can be connected to the output shaft of the internal combustion engine so that the one of the third sun gear, the third ring gear and the third carrier rotates one-to-one with the output shaft of the internal combustion engine. The rotatable shaft of the electric machine can be connected to a second of the third sun gear, the third ring gear and the third carrier so that the second of the third sun gear, the third ring gear and the third carrier rotates one-to-one with the rotatable shaft of the electric machine. A third actuator can be coupled to a third of the third sun gear, the third ring gear and the third carrier so as to modulate the rotation of the one of the third sun gear, the third ring gear and the third carrier relative to the rotation of the second of the third sun gear, the third ring gear and the third carrier over a continuous third range. The controller can be electrically coupled to the internal combustion engine and the third actuator so as to enhance the efficiency of the hybrid engine.

A hybrid engine can be provided and include an internal combustion engine having an output shaft. A third planetary gear set can be provided and have a rotatable third sun gear, a rotatable third ring gear and a plurality of third planet gears carried by a third carrier between the third sun gear and the third ring gear and rotatably engaging the third sun gear and the third ring gear. One of the third sun gear, the third ring gear and the third carrier can be connected to the output shaft of the internal combustion engine so that the one of the third sun gear, the third ring gear and the third carrier rotates one-to-one with the output shaft of the internal combustion engine. One of the first and second rotors of the electric machine can be connected to a second of the third sun gear, the third ring gear and the third carrier so that the second of the third sun gear, the third ring gear and the third carrier rotates one-to-one with the one of the first and second rotors of the electric machine. A third actuator can be coupled to a third of the third sun gear, the third ring gear and the third carrier so as to modulate the rotation of the one of the third sun gear, the third ring gear and the third carrier relative to the rotation of the second of the third sun gear, the third ring gear and the third carrier over a continuous third range.

In one embodiment, an electric machine for use with an energy storage device is provided and includes a housing, a rotor and a stator electrically interactable with the rotor carried within the housing, a rotatable shaft carried by the housing and extending from the housing, a planetary gear set having a rotatable sun gear, a rotatable ring gear and a plurality of planet gears carried by a carrier between the sun gear and the ring gear and rotatably engaging the sun gear and the ring gear, one of the sun gear, the ring gear and the carrier connected to the rotatable shaft so that the one of the sun gear, the ring gear and the carrier rotates one-to-one with the rotatable shaft and a second of the sun gear, the ring gear and the carrier connected to the rotor so that the second of the sun gear, the ring gear and the carrier rotates one-to-one with the rotor, an actuator carried by the housing and coupled to a third of the sun gear, the ring gear and the carrier so as to modulate the rotation of the one of the sun gear, the ring gear and the carrier relative to the rotation of the second of the sun gear, the ring gear and the carrier over a continuous first range.

The electric machine can further include an additional housing, an additional rotor and an additional stator electrically interactable with the additional rotor carried within the additional housing, an additional rotatable shaft carried by the additional housing and extending from the additional housing an additional planetary gear set having a rotatable additional sun gear, a rotatable additional ring gear and a plurality of additional planet gears carried by an additional carrier between the additional sun gear and the additional ring gear and rotatably engaging the additional sun gear and the additional ring gear. One of the additional sun gear, the additional ring gear and the additional carrier can be connected to the additional rotatable shaft so that the one of the additional sun gear, the additional ring gear and the additional carrier rotates one-to-one with the additional rotatable shaft. A second of the additional sun gear, the additional ring gear and the additional carrier can be connected to the rotor so that the second of the additional sun gear, the additional ring gear and the additional carrier rotates one-to-one with the additional rotor. An additional actuator can be carried by the additional housing and coupled to a third of the additional sun gear, the additional ring gear and the additional carrier so as to modulate the rotation of the one of the additional sun gear, the additional ring gear and the additional carrier relative to the rotation of the second of the additional sun gear, the additional ring gear and the additional carrier over a continuous first range. The additional rotatable shaft can be connected to the first-named rotatable shaft so as to rotate one-to-one with the first-named rotatable shaft.

The electric machine can further include a controller electrically coupled to the first-named rotor and stator and actuator and to the additional rotor and stator and actuator for controlling the contributions of the first-named rotor and the additional rotor to the rotatable shafts so as to enhance the efficiency of the electric machine. The first-named rotor and stator can have a performance and the additional rotor and stator can have a performance different than the performance of the first-named rotor and stator. The first-named rotor and stator and the additional rotor and stator can have a different performance selected from the group consisting of the first-named rotor having a magnetism that is larger than the magnetism of the additional rotor, the first-named stator having an inductance that is larger than the inductance of the additional stator, the first-named rotor having a size that is larger than the size of the additional rotor, the first-named stator having a size that is larger than the size of the additional stator, the number of first-named rotors being higher than the number of additional rotors, and the number of first-named stators being higher than the number of additional stators.

In one embodiment, an electric machine for use with an energy storage device is provided and includes a housing, a first rotor and a first stator electrically interactable with the first rotor carried within the housing, a second rotor and a second stator electrically interactable with the second rotor carried within the housing, an rotatable shaft carried by the housing and extending from the housing, a first planetary gear set having a rotatable first sun gear, a rotatable first ring gear and a plurality of first planet gears carried by a first carrier between the first sun gear and the first ring gear and rotatably engaging the first sun gear and the first ring gear, one of the first sun gear and the first carrier connected to the rotatable shaft so that such gear rotates one-to-one with the rotatable shaft and the first ring gear connected to the first rotor so that the first ring gear rotates one-to-one with the first rotor, a first actuator carried by the housing and coupled to the other of the first sun gear and the first carrier so as to modulate the rotation of the one of the first sun gear and the first carrier relative to the rotation of the first ring gear over a continuous first range, a second planetary gear set having a rotatable second sun gear, a rotatable second ring gear and a plurality of second planet gears carried by a second carrier between the second sun gear and the second ring gear and rotatably engaging the second sun gear and the second ring gear, one of the second sun gear and the second carrier connected to the rotatable shaft so that such gear rotates one-to-one with the rotatable shaft and the second ring gear connected to the second rotor so that the second ring gear rotates one-to-one with the second rotor, a second actuator carried by the housing and coupled to the other of the second sun gear and the second carrier so as to modulate the rotation of one of the second sun gear and the second carrier relative to the rotation of the second ring gear over a continuous second range, and a controller electrically coupled to the first rotor and first stator and first actuator and to the second rotor and second stator and second actuator for controlling the contributions of the first rotor and the second rotor to the rotatable shaft so as to enhance the efficiency of the electric machine.

A hybrid engine can be provided and include an internal combustion engine having an output shaft. A third planetary gear set can be provided and have a rotatable third sun gear, a rotatable third ring gear and a plurality of third planet gears carried by a third carrier between the third sun gear and the third ring gear and rotatably engaging the third sun gear and the third ring gear. The third sun gear can be connected to the output shaft of the internal combustion engine so that the third sun gear rotates one-to-one with the output shaft of the internal combustion engine. The rotatable shaft of the electric machine can be connected to the third ring gear so that the third ring gear rotates one-to-one with the rotatable shaft of the electric machine. A third actuator can be coupled to the third carrier so as to modulate the rotation of the third sun gear relative to the rotation of the third ring gear over a continuous third range. The controller can be electrically coupled to the internal combustion engine and the third actuator so as to enhance the efficiency of the hybrid engine.

A hybrid engine can be provided and include an internal combustion engine having an output shaft. A third planetary gear set can be provided and have a rotatable third sun gear, a rotatable third ring gear and a plurality of third planet gears carried by a third carrier between the third sun gear and the third ring gear and rotatably engaging the third sun gear and the third ring gear. One of the third sun gear, the third ring gear and the third carrier can be connected to the output shaft of the internal combustion engine so that the one of the third sun gear, the third ring gear and the third carrier rotates one-to-one with the output shaft of the internal combustion engine. One of the first and second rotors of the electric machine can be connected to a second of the third sun gear, the third ring gear and the third carrier so that the second of the third sun gear, the third ring gear and the third carrier rotates one-to-one with the one of the first and second rotors of the electric machine. A third actuator can be coupled to a third of the third sun gear, the third ring gear and the third carrier so as to modulate the rotation of the one of the third sun gear, the third ring gear and the third carrier relative to the rotation of the second of the third sun gear, the third ring gear and the third carrier over a continuous third range.

I claim:

1. An electric machine for use with an energy storage device, comprising a housing, a first rotor and a first stator electrically interactable with the first rotor carried within the housing, a second rotor and a second stator electrically interactable with the second rotor carried within the housing, a rotatable shaft carried by the housing and extending from the housing, a first continuously variable transmission including a first rotatable element, a second rotatable element and a mechanism for controlling the ratio of the rotation of the second element to the rotation of the first element, the first element of the first continuously variable transmission connected to the first rotor so that the first rotor rotates one-to-one with the first element and the second element of the first continuously variable transmission connected to the rotatable shaft of the electric machine so that the rotatable shaft rotates one-to-one with the second element, a second continuously variable transmission including a first rotatable element, a second rotatable element and a mechanism for controlling the ratio of the rotation of such second element to the rotation of such first element, the first element of the second continuously variable transmission connected to the second rotor so that the second rotor rotates one-to-one with such first element and the second element of the second continuously variable transmission connected to the rotatable shaft of the electric machine so that the rotatable shaft rotates one-to-one with such second element, and a controller electrically coupled to the first rotor and first stator and first mechanism and to the second rotor and second stator and second mechanism so as to modulate the rotation of the second element relative to the rotation of the first element of each of the first and second continuously variable transmissions for controlling the contributions of the first rotor and the second rotor to the rotatable shaft so as to enhance the efficiency of the electric machine.

2. The electric machine of claim 1, wherein the electric machine is selected from the group consisting of a motor and a generator.

3. A hybrid engine, comprising the electric machine of claim 1, an internal combustion engine having an output shaft, a third planetary gear set having a rotatable third sun gear, a rotatable third ring gear and a plurality of third planet gears carried by a third carrier between the third sun gear and the third ring gear and rotatably engaging the third sun gear and the third ring gear, one of the third sun gear, the third ring gear and the third carrier connected to the output shaft of the internal combustion engine so that the one of the third sun gear, the third ring gear and the third carrier rotates one-to-one with the output shaft of the internal combustion engine and one of the first and second rotors of the electric machine of claim 1 connected to a second of the third sun gear, the third ring gear and the third carrier that is exclusive of the one of the third sun gear, the third ring gear and the third carrier so that the second of the third sun gear, the third ring gear and the third carrier rotates one-to-one with the one of the first and second rotors of the electric machine of claim 1, a third actuator coupled to a third of the third sun gear, the third ring gear and the third carrier that is exclusive of the one and the second of the third sun gear the third ring gear and the third carrier so as to modulate the rotation of the one of the third sun gear, the third ring gear and the third carrier relative to the rotation of the second of the third sun gear, the third ring gear and the third carrier over a continuous third range.

4. The electric machine of claim 1, wherein the second rotor is larger than the first rotor and the second stator is larger than the first stator.

5. The electric machine of claim 4, wherein the second rotor is larger than the first rotor by a proportion and the second stator is larger than the first stator by the proportion.

6. The electric machine of claim 1, wherein the first rotor and first stator and the second rotor and second stator are coaxial.

7. The electrical machine of claim 6, further comprising a third stator coaxial with and disposed between the first rotor and the second rotor, the third stator electrically interacting with both the first rotor and the second rotor and electrically coupled to the controller, the first stator being disposed outside the first rotor and the second stator being disposed outside the second rotor.

8. The electric machine of claim 1, wherein the first rotor and first stator are configured for one of alternating current and direct current electrical interaction and the second rotor and second stator are configured for one of alternating current and direct current electrical interaction.

9. The electric machine of claim 8, where the first rotor and first stator are configured for alternating current electrical interaction and the second rotor and second stator are configured for direct current electrical interaction.

10. A hybrid engine, comprising the electric machine of claim 1, an internal combustion engine having an output shaft, a third planetary gear set having a rotatable third sun gear, a rotatable third ring gear and a plurality of third planet gears carried by a third carrier between the third sun gear and the third ring gear and rotatably engaging the third sun gear and the third ring gear, one of the third sun gear, the third ring gear and the third carrier connected to the output shaft of the internal combustion engine so that the one of the third sun gear, the third ring gear and the third carrier rotates one-to-one with the output shaft of the internal combustion engine and the rotatable shaft of the electric machine of claim 1 connected to a second of the third sun gear, the third ring gear and the third carrier that is exclusive of the one of the third sun gear, the third ring gear and the third carrier so that the second of the third sun gear, the third ring gear and the third carrier rotates one-to-one with the rotatable shaft of the electric machine of claim 1, a third actuator coupled to a third of the third sun gear, the third ring gear and the third carrier that is exclusive of the one and the second of the third sun gear, the third ring gear and the third carrier so as to modulate the rotation of the one of the third sun gear, the third ring gear and the third carrier relative to the rotation of the second of the third sun gear, the third ring gear and the third carrier over a continuous third range.

11. The hybrid engine of claim 10, wherein the controller is electrically coupled to the internal combustion engine and the third actuator so as to enhance the efficiency of the hybrid engine.

12. The electric machine of claim 1, wherein the first continuously variable transmission includes a first planetary gear set having a rotatable first sun gear, a rotatable first ring gear and a plurality of first planet gears carried by a first carrier between the first sun gear and the first ring gear and rotatably engaging the first sun gear and the first ring gear, the first element of the first continuously variable transmission being one of the first sun gear, the first ring gear and the first carrier, the second element of the first continuously variable transmission being a second of the first sun gear, the first ring gear and the first carrier that is exclusive of the one of the first sun gear, the first ring near and the first carrier and the mechanism of the first continuously variable transmission including a third of the first sun gear, the first ring gear and the first carrier that is exclusive of the one and the second of the first sun gear, the first ring gear and the first carrier and a first actuator carried by the housing and coupled to the third of the first sun gear, the first ring gear and the first carrier so as to modulate the rotation of the one of the first sun gear, the first ring gear and the first carrier relative to the rotation of the second of the first sun gear, the first ring gear and the first carrier over a continuous first range, and wherein the second continuously variable transmission includes a second planetary gear set having a rotatable second sun gear, a rotatable second ring gear and a plurality of second planet gears carried by a second carrier between the second sun gear and the second ring gear and rotatably engaging the second sun gear and the second ring gear, the first element of the second continuously variable transmission being one of the second sun gear, the second ring gear and the second carrier, the second element of the second continuously variable transmission being a second of the second sun gear, the second ring gear and the second carrier that is exclusive of the one of the second sun gear, the second ring gear and the second carrier and the mechanism of the second continuously variable transmission including a third of the second sun gear, the second ring gear and the second carrier that is exclusive of the one and the second of the second sun gear, the second ring gear and the second carrier and a second actuator carried by the housing and coupled to the third of the second sun gear, the second ring gear and the second carrier so as to modulate the rotation of the one of the second sun gear, the second ring gear and the second carrier relative to the rotation of the second of the second sun gear, the second ring gear and the second carrier over a continuous second range.

13. The electric machine of claim 12, wherein the first actuator is an electrical actuator or a mechanical actuator and the second actuator is an electrical actuator or a mechanical actuator.

14. The electric machine of claim 12, wherein the first actuator is a third continuously variable transmission including a first rotatable element, a second rotatable element and a mechanism for controlling the ratio of the rotation of the second element to the rotation of the first element, the first element of the third continuously variable transmission being coupled to the one of the first sun gear, the first ring gear and the first carrier of the first planetary gear set and the second element of the third continuously variable transmission being coupled to the third of the first sun gear, the first ring gear and the first carrier of the first planetary gear set.

15. The electric machine of claim 12, wherein the second actuator is a fourth continuously variable transmission including a first rotatable element, a second rotatable element and a mechanism for controlling the ratio of the rotation of the second element to the rotation of the first element, the first element of the fourth continuously variable transmission being coupled to the one of the first sun gear, the first ring gear and the first carrier of the second planetary gear set and the second element of the fourth continuously variable transmission being coupled to the third of the first sun gear, the first ring gear and the first carrier of the second planetary gear set.

16. An electric machine for use with an energy storage device, comprising a housing, a rotor and a stator electrically interactable with the rotor carried within the housing, a rotatable shaft carried by the housing and extending from the housing, a planetary gear set having a rotatable sun gear, a rotatable ring gear and a plurality of planet gears carried by a carrier between the sun gear and the ring gear and rotatably engaging the sun gear and the ring gear, one of the sun gear, the ring gear and the carrier connected to the rotatable shaft so that the one of the sun gear, the ring gear and the carrier rotates one-to-one with the rotatable shaft and a second of the sun gear, the ring gear and the carrier that is exclusive of the one of the sun gear, the ring gear and the carrier connected to the rotor so that the second of the sun gear, the ring gear and the carrier rotates one-to-one with the rotor, an actuator carried by the housing and coupled to a third of the sun gear, the ring gear and the carrier that is exclusive of the one and the second of the sun gear, the ring gear and the carrier so as to modulate the rotation of the one of the sun gear, the ring gear and the carrier relative to the rotation of the second of the sun gear, the ring gear and the carrier over a continuous range, an additional housing, an additional rotor and an additional stator electrically interactable with the additional rotor carried within the additional housing, an additional rotatable shaft carried by the additional housing and extending from the additional housing, an additional planetary gear set having a rotatable additional sun gear, a rotatable additional ring gear and a plurality of additional planet gears carried by an additional carrier between the additional sun gear and the additional ring gear and rotatably engaging the additional sun gear and the additional ring gear, one of the additional sun gear, the additional ring gear and the additional carrier of the additional planetary gear set connected to the additional rotatable shaft so that the one of the additional sun gear, the additional ring gear and the additional carrier rotates one-to-one with the additional rotatable shaft and a second of the additional sun gear, the additional ring gear and the additional carrier of the additional planetary gear set that is exclusive of the one of the additional sun gear, the additional ring gear and the additional carrier connected to the rotor so that the second of the additional sun gear, the additional ring gear and the additional carrier rotates one-to-one with the additional rotor, an additional actuator carried by the additional housing and coupled to a third of the additional sun gear, the additional ring gear and the additional carrier of the additional planetary gear set that is exclusive of the one and the second of the additional sun gear, the additional ring gear and the additional carrier so as to modulate the rotation of the one of the additional sun gear, the additional ring gear and the additional carrier relative to the rotation of the second of the additional sun gear, the additional ring gear and the additional carrier over a continuous additional range, the additional rotatable shaft being connected to the first-named rotatable shaft so as to rotate one-to-one with the first-named rotatable shaft.

17. The electric machine of claim 16, further comprising a controller electrically coupled to the first-named rotor and stator and actuator and to the additional rotor and stator and actuator for controlling the contributions of the first-named rotor and the additional rotor to the rotatable shafts so as to enhance the efficiency of the electric machine.

18. The electric machine of claim 16, wherein the first-named rotor and stator have a performance and the additional rotor and stator have a performance different than the performance of the first-named rotor and stator.

19. The electric machine of claim 16, wherein the first-named rotor and stator and the additional rotor and stator have a different performance selected from the group consisting of the first-named rotor having a magnetism that is larger than the magnetism of the additional rotor, the first-named stator having an inductance that is larger than the inductance of the additional stator, the first-named rotor having a size that is larger than the size of the additional rotor, the first-named stator having a size that is larger than the size of the additional stator, the number of first-named rotors being higher than the number of additional rotors, and the number of first-named stators being higher than the number of additional stators.

* * * * *